(12) United States Patent
Kecht et al.

(10) Patent No.: US 10,953,684 B2
(45) Date of Patent: Mar. 23, 2021

(54) PIGMENT SYSTEM, LUMINESCENT DYE SYSTEM, AND VALUE DOCUMENT

(71) Applicant: GIESECKE+DEVRIENT CURRENCY TECHNOLOGY GMBH, Munich (DE)

(72) Inventors: Johann Kecht, Munich (DE); Axel Schlossbauer, Munich (DE); Thomas Giering, Kirchseeon (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 328 days.

(21) Appl. No.: 15/774,065

(22) PCT Filed: Nov. 9, 2016

(86) PCT No.: PCT/EP2016/001863
§ 371 (c)(1),
(2) Date: May 7, 2018

(87) PCT Pub. No.: WO2017/080654
PCT Pub. Date: May 18, 2017

(65) Prior Publication Data
US 2018/0311992 A1    Nov. 1, 2018

(30) Foreign Application Priority Data
Nov. 11, 2015    (DE) .................... 10 2015 014 560.6

(51) Int. Cl.
*B42D 25/387*    (2014.01)
*C09K 11/02*    (2006.01)
(Continued)

(52) U.S. Cl.
CPC ......... *B42D 25/387* (2014.10); *B42D 25/355* (2014.10); *B42D 25/373* (2014.10);
(Continued)

(58) Field of Classification Search
CPC .................................................. C09B 67/0013
See application file for complete search history.

(56) References Cited

U.S. PATENT DOCUMENTS 3,755,222 A    8/1973   Gruber et al.
5,795,379 A    8/1998   Schwenk et al.
(Continued)

FOREIGN PATENT DOCUMENTS

DE    102012013244 A1    1/2014
EP         1308485 A1    5/2003
(Continued)

OTHER PUBLICATIONS

International Search Report from PCT Application No. PCT/EP2016/001863, Feb. 27, 2017.

*Primary Examiner* — Vu A Nguyen
(74) *Attorney, Agent, or Firm* — Workman Nydegger

(57) ABSTRACT

A pigment system of different capsule-luminescent pigments have different emission spectra, preferably different color impressions of the luminescence emission, and possess substantially the same chemical stabilities. The capsule-luminescent pigments are based on organic or metalorganic luminescent substances.

23 Claims, 1 Drawing Sheet

(51) Int. Cl.
    *C09D 11/037*     (2014.01)
    *C09D 11/50*     (2014.01)
    *C09B 67/00*     (2006.01)
    *B42D 25/355*     (2014.01)
    *C09K 11/06*     (2006.01)
    *C09B 67/08*     (2006.01)
    *C09B 67/22*     (2006.01)
    *C09B 67/02*     (2006.01)
    *G07D 7/00*     (2016.01)
    *G07D 7/1205*     (2016.01)
    *D21H 21/30*     (2006.01)
    *C08L 75/02*     (2006.01)
    *C08L 61/28*     (2006.01)
    *C08L 33/12*     (2006.01)
    *C08K 3/013*     (2018.01)
    *C08K 5/00*     (2006.01)
    *C08G 18/38*     (2006.01)
    *C08G 18/75*     (2006.01)
    *C08G 18/79*     (2006.01)
    *D21H 21/40*     (2006.01)
    *B42D 25/373*     (2014.01)
    *B42D 25/29*     (2014.01)

(52) U.S. Cl.
    CPC ....... *C08G 18/3851* (2013.01); *C08G 18/755* (2013.01); *C08G 18/792* (2013.01); *C08K 3/013* (2018.01); *C08K 5/0041* (2013.01); *C08L 33/12* (2013.01); *C08L 61/28* (2013.01); *C08L 75/02* (2013.01); *C09B 67/0013* (2013.01); *C09B 67/0033* (2013.01); *C09B 67/0097* (2013.01); *C09D 11/037* (2013.01); *C09D 11/50* (2013.01); *C09K 11/02* (2013.01); *C09K 11/025* (2013.01); *C09K 11/06* (2013.01); *D21H 21/30* (2013.01); *D21H 21/40* (2013.01); *G07D 7/003* (2017.05); *G07D 7/1205* (2017.05); *B42D 25/29* (2014.10)

(56) References Cited

U.S. PATENT DOCUMENTS

| | | |
|---|---|---|
| 7,821,675 B2 | 10/2010 | Coyle et al. |
| 8,523,238 B2 * | 9/2013 | Sekine ............... B42D 25/29 283/92 |
| 9,096,770 B2 * | 8/2015 | Hasegawa ........... C09D 11/102 |
| 9,327,542 B2 | 5/2016 | Kecht et al. |
| 2015/0328915 A1 | 11/2015 | Kecht et al. |
| 2016/0032121 A1 * | 2/2016 | Moore ............... C08G 18/0823 524/497 |
| 2016/0206758 A1 * | 7/2016 | Achilefu ........... A61K 49/0056 |

FOREIGN PATENT DOCUMENTS

| | | |
|---|---|---|
| EP | 1346839 A2 | 9/2003 |
| EP | 1826730 A2 | 8/2007 |
| EP | 2602119 A1 | 6/2013 |
| WO | 2005062692 | 7/2005 |
| WO | 2008141972 A1 | 11/2008 |

* cited by examiner

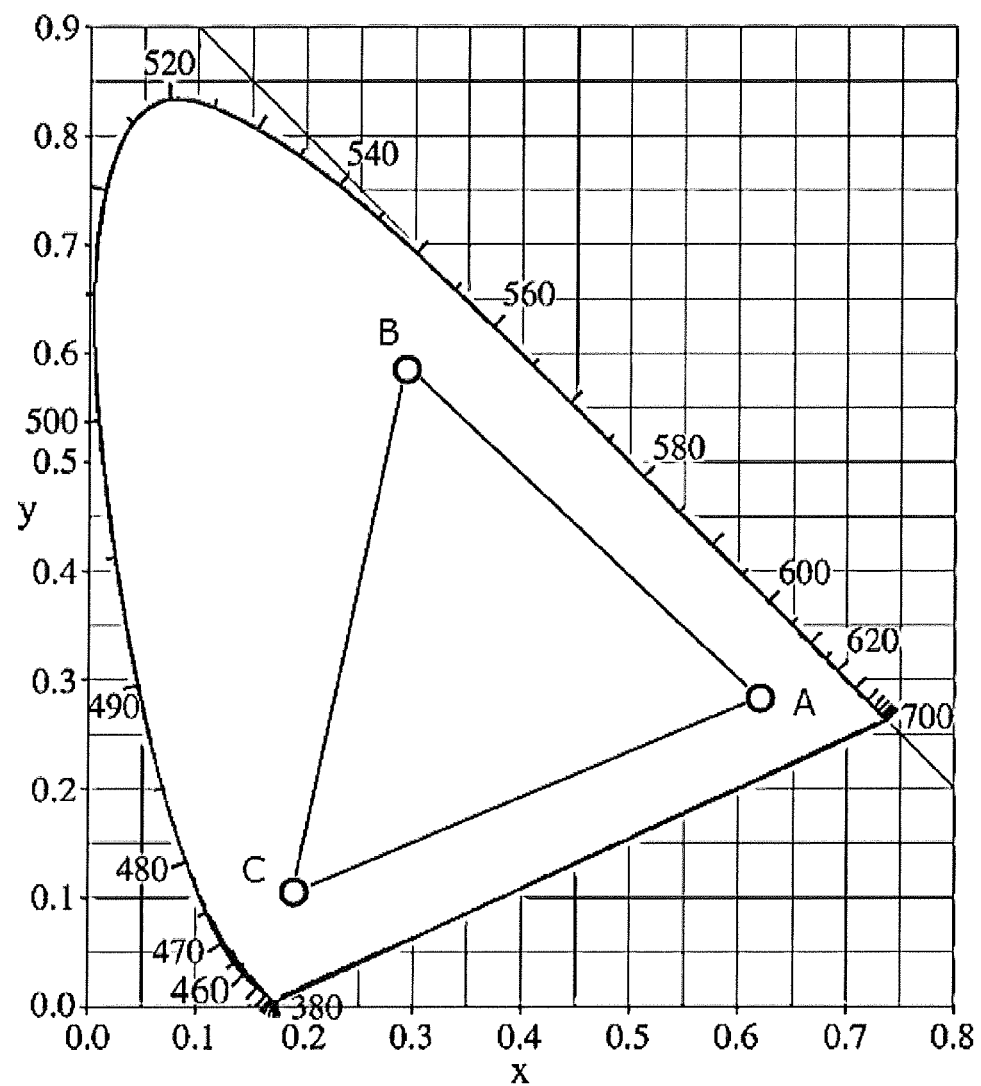

PIGMENT SYSTEM, LUMINESCENT DYE SYSTEM, AND VALUE DOCUMENT

BACKGROUND

The invention relates to a pigment system, a luminescence ink system and a value document, e.g. a bank note.

The invention relates in particular to a luminescence ink system which is based on organic capsule-luminescent pigments.

The pigment system according to the invention is characterized in that the different luminescent pigments which establish the luminescence ink system respectively have comparable chemical and physical stabilities. This prevents a non-uniform change of the luminescence color impression by chemical or physical factors (e.g. migration, environmental influences, organic solvents, acids and bases, UV irradiation, daylight). The luminescence ink system is employed in particular for manufacturing value documents, e.g. by printing on suitable substrates.

Various absorption ink systems for normal printing inks are known in the prior art, e.g. on the basis of CMYK inks. There also exist special absorption ink systems for the employment as security inks in value documents in the prior art. For example, EP 1308485 A1 describes a 4-color-printing ink system with adjusted IR absorptions.

These "normal" absorption inks generate a color impression by the absorption of certain wavelength portions of the backscattered light, hence, in the case of CYMK systems etc. one speaks of subtractive color mixture.

Luminescence ink systems can be structured analogously, except that here the color impression of a luminescence emission (e.g. during the UV excitation) is used. Luminescent inks hence are mostly RGB color systems because the optically perceptible color impression is generated here by an additive color mixture of the different emission colors.

For achieving different-colored color impressions of the luminescence in a colored luminescence picture, often luminescent substances of different structure and different stability are employed. For example, a red color of a flag in the luminescence picture is generated with a first luminescent substance and an adjacent green color of a flag in the luminescence picture is generated with a second luminescent substance. As different luminescent substances are used, these behave differently against physical and chemical influences, which in the course of time or of physical and/or chemical influences leads to a change of the luminescence picture. Such an effect is also known for normal absorption ink systems and leads, besides the fading of the picture, also to strong, undesirable color shifts. A further disadvantage of a such structured luminescence picture is that the color-giving luminescent substances on account of their different properties are not freely mixable or segregate in the printing process. This makes it difficult or impossible to set the desired luminescence picture colors (color management).

It is hence desirable to provide a luminescence ink system which can be manufactured in a stable fashion and with which useful references can be created.

Furthermore, in the prior art so-called true-color luminescence pictures are utilized. These are more complex, multicolor luminescence pictures which, e.g., can also show color gradations. These are often combined with a (absorption-ink-based) picture, so that one sees, e.g., a single-color portrait on a bank note, which under UV illumination luminesces in multicolor fashion, in colors similar to a photograph, so to speak.

On account of the need to utilize several different luminescent substances here, which have to be printed at the same time or with each other, the above-mentioned disadvantages are even more intensified (as no uniform ink formulation system is present and no uniform stability is given for the different luminescent substances). This prevents the practicable employment of true-color fluorescence pictures as a security element and design element.

The luminescence ink systems according to the invention do not have these disadvantages, hence complex true-color luminescence pictures with only one ink formulation system and similar stabilities of all (mixed) inks are possible here.

In the prior art there is also known the use of inorganic luminescent pigments. Although these mostly possess excellent stabilities, they have in comparison to the typically used organic luminescent substances significantly lower luminescence intensities, however. Furthermore, inorganic illuminants further have, on account of their different densities, surface charges, grain sizes, particle forms etc., the disadvantage that various ink formulations are necessary or that different pigments behave differently upon printing. Hence, they are no suitable substitute for the luminescence ink system according to the invention.

The print EP 2602119 A1 describes a luminescence ink system with two inks which upon irradiation with different excitation wavelengths generate different fluorescence emissions. Specifically, a system is described, in which the inks upon single excitation with UV-A or UV-C radiation have the respectively contrary emission colors (e.g. color 1: red/green; color 2: green/red), and hence upon combined irradiation with both wavelengths show the same mixed color (color 1=color 2=yellow). However, neither the temporal and chemical stability of the color impressions, nor the possible difficulties when printing these patterns are discussed.

The print WO 2005/062692 A2 describes a color-coded latent image, including UV-excitable latent images from a RGB luminescence ink system. As, however, no capsule-luminescent pigments adjusted to stability are used, but different luminescent dyes, no uniform (high) chemical stability and light stability or uniform print properties are given. Hence, the described systems are thus inferior to the systems of the invention made from adjusted luminescent pigments with uniform properties. For example, the latent images introduced in WO 2005/062692 A2 significantly change their color upon a treatment with organic solvents like acetone or after a long UV irradiation, while analogous latent images made of a luminescence ink system according to the present invention do not do this.

The print U.S. Pat. No. 7,821,675 B2 describes an additive color system with luminescent ink jet inks. It can also be used for safeguarding value documents. The representation of motifs in true-color luminescence made of mixtures of the three inks is also described. The approximation of the different chemical and physical stabilities of the organic and inorganic luminescent substances used is not mentioned.

EP 1346839 A2 describes systems of at least two fluorescence substances with (radiant) energy transfer, in which a luminescent substance passes on the absorbed energy to a further luminescent substance and thus excites the latter to emission. These systems are not stability-adjusted.

The present invention is based on the object of providing a luminescence ink system improved compared to the prior art.

This object is achieved by the feature combinations defined in the independent claims. Developments of the invention are the subject matter of the subclaims.

SUMMARY OF THE INVENTION 1. (First aspect) Pigment system with at least two kinds of capsule-luminescent pigments which have different emission spectra of the luminescence emission and which respectively have at least one core with a luminescent substance and a shell encapsulating the at least one core, wherein the luminescent substances respectively are organic or metalorganic luminescent substances and wherein for each of the at least two kinds of capsule-luminescent pigments the material of the at least one core, the material of the shell, and the thickness of the shell are mutually coordinated such that the at least two kinds of capsule-luminescent pigments have a substantially same chemical stability.

2. (Preferred) Pigment system according to section 1, wherein for each kind of capsule-luminescent pigment the material of the shell of the capsule-luminescent pigments is chosen from a condensation polymer, preferably a melamine formaldehyde condensation polymer.

3. (Second aspect) Pigment system made of at least two kinds of capsule-luminescent pigments with different emission spectra, wherein the material of the shell of the capsule-luminescent pigments is respectively chosen from a condensation polymer, preferably a melamine formaldehyde condensation polymer, in order to impart substantially same chemical stability to the capsule-luminescent pigments.

4. (Preferred) Pigment system according to section 2 or 3, wherein the kinds of capsule-luminescent pigments respectively have the same condensation polymer as a shell material.

4a. (Preferred) Pigment system according to section 1 or 3, wherein the kinds of capsule-luminescent pigments are manufactured according to one of the methods of variant 1, variant 2 or variant 3.

4b. (Preferred, Variant 1) Pigment system according to any of sections 1 to 4a, wherein at least one of, preferably all, the capsule-luminescent pigments are based on core-shell particles having a core based on a thermoplastic polymer, a shell based on a condensation polymer, and an organic or metalorganic feature substance present in the core in dissolved or finely distributed form, wherein the mass fraction of the shell is more than 25%, preferably 50%, particularly preferably more than 100% relative to the mass of the core.

4c. (Preferred, Variant 1) Pigment system according to section 4b, wherein the thermoplastic polymer is chosen from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, preferably from polystyrene (PS) or from one of polyacrylates, polymethyl methacrylate (PMMA), polyvinyl acetate (PVAC), polyvinyl chloride (PVC), polyacrylonitrile (PAN), acrylonitrile butadiene styrene copolymer (ABS), particularly preferably from polystyrene (PS) or polymethyl methacrylate (PMMA).

4d. (Preferred, Variant 1) Pigment system according to section 4b or 4c, wherein the core-shell particle comprises exactly one core and one shell.

4f. (Preferred, Variant 1) Pigment system according to section 4b or 4c, wherein the core-shell particle comprises several cores and one shell.

4g. (Preferred, Variant 1) Pigment system according to any of sections 4b to 4f, wherein the feature substance is present in the thermoplastic polymer in a dissolved manner.

4h. (Preferred, Variant 2) Pigment system according to section 1 or 3, wherein at least one of the capsule-luminescent pigments [is based—added by Translator] on core-shell particles with a core based on an organic addition polymer, a shell based on an organic condensation polymer, and an organic or metalorganic luminescent substance present in finely distributed or dissolved form in the core, wherein the addition polymer is a three-dimensional crosslinked duromer.

4i. (Preferred, Variant 2) Pigment system according to section 4h, wherein the addition polymer is formed from trimeric isocyanate monomers, preferably isocyanurate trimers from isophorone diisocyanate and amines or alcohols, preferably amines.

4j. (Preferred, Variant 2) Pigment system according to section 4h or 4i, wherein the amines are selected from monoamines, diamines and triamines and preferably comprise triamines.

4k. (Preferred, Variant 2) Pigment system according to any of sections 4h to 4j, wherein the condensation polymer of the shell and the addition polymer of the core contain at least one same monomer as a polymer constituent.

4l. (Preferred, Variant 2) Pigment system according to any of sections 4h to 4k, wherein the condensation polymer of the shell includes melamine as a monomer and preferably at the same time the addition polymer of the core includes melamine as a monomer.

4m. (Preferred, Variant 1 or 2) Pigment system according to any of sections 4b to 4l, wherein the condensation polymer of the shell is chosen from aminoplasts, phenoplasts, melamine formaldehyde resins (MF), melamine phenol formaldehyde resins (MPF), phenol formaldehyde resins (PF), urea formaldehyde resins (UF), melamine guanidine formaldehyde resins or phenol resorcin formaldehyde resins.

4n. (Preferred, Variant 3) Pigment system according to section 1 or 3, wherein at least one of the capsule-luminescent pigments are based on core-shell particles, comprising:
a duromer matrix, and
embedded therein a plurality of core particles of a thermoplastic polymer with a fluorescent or phosphorescent feature substance dissolved in the core particles, wherein the feature substance is an organic or a metalorganic substance.

4o. (Preferred, Variant 3) Pigment system according to section 4n, wherein the fluorescent or phosphorescent feature substance is excitable in the UV spectral region and emits in the visible spectral region.

4p. (Preferred, Variant 3) Pigment system according to section 4n or 4o, wherein the thermoplastic polymer is selected from polystyrene (PS), polyacrylates, polymethyl methacrylate (PMMA), polyvinyl acetate (PVAC), polyvinyl chloride (PVC), polyacrylonitrile (PAN), acrylonitrile butadiene styrene copolymer (ABS), polyethylene (PE) or polypropylene (PP), polycarbonates (PC), polyamides (PA), polyesters or polyethylene terephthalate (PET).

4q. (Preferred, Variant 3) Pigment system according to any of sections 4n to 4p, wherein the chain lengths of the thermoplastic polymers are in the region of 1000-1000000 g/mol, in particular at 50000-250000 g/mol.

4r. (Preferred, Variant 3) Pigment system according to any of sections 4n to 4q, wherein the duromer matrix comprises an addition polymer, preferably a mixture of different monoamines, diamines or triamines and a trimeric isocyanate monomer, particularly preferably the isocyanurate trimers of isophorone diisocyanate.

4s. (Preferred, Variant 3) Pigment system according to any of sections 4n to 4r, wherein the thermoplastic core particle in the duromer matrix is present in a concentration between 0.1 and 25 weight percent, in particular 3-20 weight percent.

5. (Preferred) Pigment system according to any of sections 1 to 4s, wherein the at least two kinds of capsule-luminescent pigments have a substantially same chemical stability against organic solvents, aqueous acids, aqueous bases and aqueous redox-active solutions.

6. (Preferred) Pigment system according to any of sections 1 to 5, wherein the at least two kinds of capsule-luminescent pigments have a substantially same chemical stability upon an exposure to toluene, ethyl acetate, hydrochloric acid (5%), sodium hydroxide solution (2%) and sodium hypochlorite solution (5% active chlorine) for 5 minutes, wherein the luminescence intensity remaining after the test is higher than 80% of the initial intensity.

7. (Preferred) Pigment system according to any of sections 1 to 6, wherein the at least two kinds of capsule-luminescent pigments have different color impressions of the luminescence emission.

8. (Preferred) Pigment system according to any of sections 1 to 7, wherein at least one kind of capsule-luminescent pigment, preferably all kinds of capsule-luminescent pigments, are excitable with UVA radiation, preferably at a wavelength of 365 nm.

9. (Preferred) Pigment system according to any of sections 1 to 8, wherein at least one kind of capsule-luminescent pigment, preferably all kinds of capsule-luminescent pigments are excitable with UVC radiation, preferably at a wavelength of 254 nm.

10. (Preferred) Pigment system according to any of sections 1 to 9, wherein in at least one kind of capsule-luminescent pigment there are present two different luminescent substances in finely distributed or dissolved form, which form an energy transfer system in which the first luminescent substance after excitation transfers its excitation energy partially or completely to the second luminescent substance.

11. (Preferred) Pigment system according to any of sections 1 to 10, wherein the different kinds of capsule-luminescent pigments have substantially the same chemical stability against acetone according to the test method A5, wherein the luminescence intensity remaining after the test is higher than 80% of the initial intensity.

12. (Preferred) Pigment system according to any of sections 1 to 11, wherein the different kinds of capsule-luminescent pigments have substantially the same light fastness, differ by less than 30 percentage points in particular according to test method B and preferably achieve at least blue wool scale 3.

13. (Preferred) Pigment system according to any of sections 1 to 12, wherein the color impression of the luminescence emission of arbitrary mixtures of capsule-luminescent pigments shifts by less than $\Delta D<0.03$ at blue wool scale 1, preferably at blue wool scale 2, particularly preferably at blue wool scale 3, after UV irradiation according to test method B.

14. (Preferred) Pigment system according to section 12 or 13, wherein the light fastness of at least one kind of capsule-luminescent pigment is obtained by a mixture of luminescent dyes having different light fastnesses.

15. (Preferred) Pigment system according to any of sections 12 to 14, wherein a mixture of two kinds of capsule-luminescent pigments with substantially same color impression, but different light fastnesses in sum has substantially the same light fastness as a third kind of capsule-luminescent pigment with different color impression of the luminescence emission.

16. (Preferred) Pigment system according to any of sections 1 to 15, which comprises at least 3 kinds of capsule-luminescent pigments with different color impressions, wherein, preferably, the respective color impressions of the luminescence emission are red, green and/or blue.

17. (Third aspect) Set of ink concentrate with at least two ink concentrates with a pigment system according to any of sections 1 to 15, wherein the kinds of capsule-luminescent pigments are respectively present in the ink concentrates preferably with a capsule-luminescent pigment portion of >40%.

18. (Fourth aspect) Set of printing inks with at least two printing inks with a pigment system according to any of sections 1 to 15, wherein the kinds of capsule-luminescent pigments are respectively present in the printing inks preferably with a capsule-luminescent pigment portion of 1-40%, particularly preferably 1-20%.

19. (Preferred) Printing ink with a pigment mixture of the pigment system according to any of sections 1 to 15 or with a mixture of ink concentrates from the set of ink concentrates according to section 17 or with a mixture of printing inks from the set of printing inks according to section 18.

20. (Fifth aspect) Polymer composition with a pigment system according to any of sections 1 to 15, preferably in the form of masterbatches, value document substrates, security foils, mottling fibers or security threads.

21. (Sixth aspect) Value document, mottling fiber, security thread or security foil with a pigment system according to any of sections 1 to 15.

22. (Preferred) Value document, mottling fiber, security thread or security foil according to section 21, wherein the different kinds of capsule-luminescent pigments are printed either together in a mixed ink at one place or respectively separate at different places.

23. Value document or security foil according to section 21 or 22, wherein the different kinds of capsule-luminescent pigments form a luminescent true-color picture.

BRIEF DESCRIPTION OF THE DRAWINGS

FIG. 1 shows the representation of an RGB color system with reference to the CIE color chart.

DETAILED DESCRIPTION OF THE INVENTION

The invention contains a luminescence ink system which is based on organic capsule-luminescent pigments. The luminescence ink system is characterized in that the different luminescent inks establishing the luminescence ink system respectively have comparable chemical and physical stabilities. This prevents a non-uniform change of the luminescence color impression by chemical and physical factors (e.g. migration, environmental influences, organic solvents, acids and bases, UV irradiation, daylight). The luminescence ink system is employed in particular for manufacturing value documents, e.g. by printing suitable value document substrates.

Today, known multi-color luminescence prints (e.g. a flag in the colors red-yellow-green or a true-color portrait) can change through the above-described chemical and physical factors because they are composed of luminescent substances having various different stabilities. For example, one luminescent substance is stable, while a different one has no sufficient comparable stability, which leads to disadvantages upon application. For instance, upon the action of e.g. organic solvents or UV light, one luminescent ink of the luminescence ink system may grow more pale than the others. In this manner, if it is a color mixture, e.g. the perceived color tone alters.

With the multi-color luminescence proofs according to the invention, however, no alteration occurs. The color tone here does not alter even upon heavy stress, because all luminescent inks of the luminescence ink system lose their intensity in the same manner.

Another advantage of the luminescence ink system according to the invention consists in the use of luminescent substances which chemically and physically behave comparably. This achieves that a once found solution (color management) for the achievement of a certain visible or technically measurable, detectable color tone of the luminescence remains constant over the course of the manufacture of the ink, of the proof and further printing and that e.g. segregations of the luminescence ink system are decreased or avoided.

The pigments of the luminescence ink system according to the invention are special organic core-shell particles with high solvent stabilities, so-called capsule-luminescent pigments. Capsule-luminescent pigments are composed of a core made of a first material, in which a luminescent dye is distributed, and of a shell made of a second material. Preferably, the first and second material are different polymers.

Here, two basic forms of capsule-luminescent pigments exist: (a) capsule-luminescent pigments with a single core and (b) capsule-luminescent pigments with several cores.

According to a preferred embodiment, the capsule-luminescent pigments of the luminescence ink system are capsule-luminescent pigments with one single core. There is present one single core which is surrounded by a shell. This achieves an especially high protection against chemicals, because the shell can homogeneously surround the core. This embodiment thus offers qualitative advantages.

According to a further preferred embodiment, the capsule-luminescent pigments of the luminescence ink system are capsule-luminescent pigments with several cores. Here, several cores distributed in a shell material are present. As it is possible here that individual cores are located at or near the outer surface and thus experience less protection by the shell, in comparison to capsule-luminescent pigments with one single core a less strong protective effect against chemicals is achieved here. However, such particles can be manufactured significantly more cost-effectively and still have a high chemical stability.

This embodiment thus offers manufacture-technology advantages.

According to a preferred embodiment, all capsule-luminescent pigments of the luminescence ink system have the same shell, the shell being preferably based on a condensation polymer, particularly preferably based on a melamine formaldehyde condensation polymer. Preferably, these are capsule-luminescent pigments with one core and one shell.

According to a further preferred embodiment, all capsule-luminescent pigments of the luminescence ink system have the same shell, the shell being preferably based on an addition polymer, particularly preferably on an isocyanate-based addition polymer which includes, among others, melamine as a monomer. Preferably, these are capsule-luminescent pigments with several cores and one shell.

According to a preferred embodiment, all capsule-luminescent pigments of the luminescence ink system have very thick shells, that is, the weight portion of the shell relative to the weight portion of the core is more than 20%, preferably more than 30%, particularly preferably more than 50%.

In the following, three preferred variants are stated, which describe suitable capsule-luminescent pigments.

Variant 1: Capsule-Luminescent Pigments with a Core from Thermoplastics and a Condensation Polymer Shell According to the present variant, the luminescent dyes are embedded in a thermoplastic polymer core, e.g. from polymethyl methacrylate (PMMA) or polystyrene (PS) and are encased in a shell from a crosslinked polar condensation polymer, e.g. from melamine formaldehyde resin (MF). The shell from MF protects the dye, as a result of its quality as a crosslinked insoluble polymer, in particular from organic solvents. The core from PMMA or PS protects the feature substance from aqueous or strongly polar solvents which could diffuse through the MF. Furthermore, PMMA and PS take up most of the feature substances very well and thus enable the homogeneous distribution thereof in the core material. Besides PMMA/PS and MF, other types of polymers having similar properties can also be used to produce analogous core-shell particles.

A custom, multi-level protection against a broad spectrum of chemical attacks is achieved.

Subject matter of the present variant 1 is in particular a special method for manufacturing core-shell particles from a thermoplastic non-crosslinked polymer (e.g. PMMA, PS) and a strongly crosslinked, polar condensation polymer (MF).

Here, solvent-containing drops are formed, encased and subsequently the solvent is removed to finally obtain encased firm cores.

The non-crosslinked (core) polymer together with a luminescent dye is dissolved in an organic solvent and dispersed in the form of small droplets with the help of an emulsifier. Subsequently, the droplets are encased by weakly crosslinked shell material, the solvent is removed from the core (which causes the core polymer to precipitate in the core together with the luminescent dye distributed therein) and subsequently the shell is locked by further crosslinking.

The first process step is based on the emulsification of droplets of organic solvents in water. For this, only such solvents are suitable, which in water form a separate phase, that is, are not or hardly mixable with water. Such solvents include, for example, certain esters such as ethyl acetate, certain aromatic solvents such as toluene and benzene, certain ethers such as THF, and certain halogenated solvents. As an organic solvent there is preferably used a chlorinated solvent, as for example chloroform, dichloromethane, 1,1,1-trichloroethane, trichloroethylene or tetrachloroethylene.

As a core polymer there are suitable all the polymers soluble in the preferred organic solvents, polymers soluble preferably in chlorinated solvents. For increasing the solubility, the polymers of the core material are preferably unbranched or only weakly branched.

The chain lengths of the polymers of the core material here preferably lie in the region of 1000 to 1 000 000 g/mol, particularly preferably at 50 000 to 250 000 g/mol.

The polymer of the core material consists of thermoplastics, preferably of a thermoplastic, non-crosslinked polymer. According to a preferred embodiment, the polymer of the core material consists of polymerized ethylene derivatives, particularly preferably of polystyrene (PS) or polyacrylates, including preferably polymethyl methacrylate (PMMA), polyvinyl acetate (PVAC), polyvinyl chloride (PVC), polyacrylonitrile (PAN) or of one, two or several of these copolymers containing polymers, such as e.g. acrylonitrile butadiene styrene copolymers (ABS). According to a further preferred embodiment, the ethylene derivatives are polyethylene (PE), polypropylene (PP) or other polymers constructed from aliphatic carbon chains.

According to a further preferred embodiment, the polymer of the core material consists of polycarbonates (PC), polyamides (PA), or polyesters such as polyethylene terephthalate (PET).

As tensides or emulsifiers substances are suitable which can disperse the respective organic solvent in water, for example, non-ionic tensides, anionic tensides, cationic tensides, amphotere tensides. There are preferably used anionic tensides or a mixture of anionic tensides and non-ionic tensides. Preferred anionic tensides are sulfate-based tensides, e.g. fatty alcohol sulfates (alkyl sulfates) or fatty alcohol ether sulfates. According to a further embodiment, the preferred anionic tensides are carboxylate-based tensides, e.g. alkyl carboxylates. According to a further embodiment, the preferred anionic tensides are sulfonate-based tensides, e.g. alkyl sulfonates. According to a further embodiment, the preferred anionic tensides are phosphate-based tensides, e.g. alkyl ether phosphates.

Anionic tensides have the advantage that the negative charge of the headgroup promotes the accumulation of positively charged condensation products from the shell formation.

The tensides are preferably employed in an amount of 0.0001 to 10 wt. % aqueous solution, further preferably 0.1 to 5 wt. %, particularly preferably 0.5 to 2 wt. %.

The organic phase including the polymer (and the luminescent dye) is dispersed in the aqueous phase with the help of the tenside.

Preferably, the portion of dissolved polymer in the organic solvent is 1 to 20%, particularly preferably 3 to 10%.

Preferably, the portion of organic phase is 1 to 60 vol. % of the phase mixture, particularly preferably 10 to 30 vol. %. With smaller portions only lower yields are achieved, larger portions make the homogeneous dispersion of the organic phase more difficult, which has an adverse effect on the efficiency of the method.

The dispersion of the organic phase in the aqueous phase is preferably effected mechanically, e.g. by stirring, ultrasound or special devices for the targeted incorporation of shear forces. Homogenizing systems such as e.g. so-called homogenizer units or rotor-stator systems such as e.g. systems of the Ultra-Turrax type of the IKA company are preferably used.

Dispersing the organic phase in the aqueous phase can be effected one time or continuously. With a onetime dispersing, the dispersion is set to be effected at the start of the reaction, e.g. by a short treatment with a homogenizing system, and in the further course is stirred or intermixed e.g. only by a second system which is not suitable for dispersing. The homogenizing system is thus only employed for a short time, but the dispersion remains stable even without a further employment. With continuous dispersing the homogenizing system is employed over the entire reaction time. Here, normally, no second system is required for stirring/intermixing the reaction solution.

The polymers of the shell material are preferably strongly crosslinked thermosetting plastics. According to a preferred embodiment, the polymer of the shell material consists of units polymerized by condensation reactions, such as e.g. aminoplasts and phenoplasts, particularly preferably from aminoplasts. Preferably, these are melamine formaldehyde resins (MF), melamine phenol formaldehyde resins (MPF), phenol formaldehyde resins (PF), urea formaldehyde resins (UF), as well as resin types related thereto, e.g. melamine guanidine formaldehyde resins or phenol resorcin formaldehyde resins. According to a further preferred embodiment, in the resin material the formaldehyde is replaced completely or partly by a different aldehyde, e.g. by furfural.

For producing the shell, preferably a water-soluble prepolymerizate is employed. For this there can be employed both commercially obtainable prepolymerizates (e.g. Cymel 300 of the Allnex company) or prepolymerizates manufactured from the respective individual components, e.g. melamine and formaldehyde, by heating in an aqueous solution.

The prepolymerizate preferably includes methylolized amines, in particular methylolized melamine.

The prepolymerizate can be incorporated in the aqueous phase before, during or after the incorporation and dispersing of the organic phase and the aqueous phase. Preferably, the prepolymerizate is added after the dispersing of the organic phase, because often a more homogeneous droplet size of the dispersed phase can be achieved.

According to a preferred case of application, the entire required amount of prepolymerizate is added all at once.

According to a further preferred case of application, the required amount of prepolymerizate is added in portions, for example one half at the start of the reaction and the second half after the removal of the organic solvent According to a further preferred case of application, the prepolymerizate is continuously added over the entire reaction time or over parts of the reaction time, for example, via an electronically controlled dosing pump.

The amounts added and the times of addition can influence the density of the formed shell, because e.g. by an addition in portions the defects which arose in a first step of the shell formation can be filled and altogether a more controlled growth of the layer is made possible. It is particularly preferred that a part of the prepolymerizate is added only after the organic solvent has been completely removed.

If the entire prepolymerizate is added only after the organic solvent has been removed, no sealing layer formation takes place. The presence of the organic solvent is an integral part for the accumulation of the MF shell, an accumulation to "naked" already precipitated core material does not take place.

For controlling the speed and the magnitude of the polymerization of the prepolymerizate, the pH value is set. The setting can be effected at the beginning of the reaction and remain constant or can be altered step by step or continuously. According to a preferred embodiment, the pH value is set at the reaction start and is left constant over the reaction time. According to a further preferred embodiment, the pH value is adjusted at certain points in time in the reaction course, for example, the pH value is not adjusted at the beginning of the reaction, is set at the first value by the addition of acid at a later point in time, and is set at the second value by further addition of acid at an even later point in time. According to a further preferred embodiment, the pH value is continuously altered over the entire course of the reaction or over parts of the course of the reaction, for example by an electronically controlled dosing pump which meters an acid solution into the reaction solution.

The adjustment of the pH value is effected via the addition of acids or buffer systems. Preferably, organic acids with a pKs value in a region of 3.5 to 5.5 are employed, for example acetic acid, or buffer systems which are based on such acids and their salts, for example a formic acid formate buffer.

The adjustment of the pH value is here preferably effected within a region of pH 7 to pH 2, particularly preferably pH 6 to pH 3.

Independent of the reaction course of the condensation reaction of the shell, a lowering of the pH value (also to values lower than for example pH 1) can be effected at the end of the reaction, so as to facilitate the reprocessing (filtration) by an agglomeration of the particles.

Besides the pH value, the temperature of the reaction solution is an important control parameter for both the condensation reaction of the shell material and the removing of the organic solvent. According to a preferred embodiment, the temperature is increased step by step, e.g. from room temperature after a certain reaction time to 40° C. and then after a certain further reaction time from 40° C. to 80° C. According to a further preferred embodiment, the temperature is continuously altered over the entire reaction time or over parts of the reaction time.

According to a preferred embodiment, for removing the organic solvent, the temperature is kept near the boiling point of the organic solvent. Preferably, the holding temperature here is not less than 10° C. away from the boiling point of the solvent, particularly preferably not less than 5° C. However, the holding temperature preferably is not at or higher than the boiling point of the organic solvent, because this could impair the integrity of the shell.

According to a preferred embodiment, instead of or in addition to the rise of the temperature there is applied a negative pressure in order to achieve the removing of the organic solvent.

According to a preferred embodiment, the removing of the organic solvent is effected, without applying a negative pressure and without additional temperature increase, by stirring at room temperature over a certain period.

The curing of the shell material preferably takes place in the temperature region of 50° C. to 100° C., particularly preferably in the temperature region of 70 to 80° C.

Preferably, the removal of the solvent takes place over a period of at least 20 minutes, the period being particularly preferably at least 1 h. Preferably, the curing of the shell material preferably takes place over a period of at least 30 minutes, the period being particularly preferably at least 1 h.

The size of the resultant core-shell particles is here preferably 0.1 µm to 20 µm, further preferably 0.5 µm to 5 µm, particularly preferably 1 µm to 3 µm.

Preferably, the mass fraction of the shell is more than 20% of the mass of the core material, further preferably more than 50% of the mass of the core material, particularly preferably more than 100% of the mass of the core material.

The portion of the luminescent dye in the core material is preferably between 0.01 to 30 weight percent, further preferably between 0.1 to 20 weight percent, particularly preferably between 1 and 15 weight percent.

Variant 2: Capsule-Luminescent Pigments with a Core from Duromers and a Condensation Polymer Shell This variant includes an advantageous development of the method known from the print U.S. Pat. No. 5,795,379 A for incorporating luminescent dyes into a solid resin. The method contains a further refinement step for protecting the printing ink including the luminescent pigment (or the value document) against the usually typical migration or the so-called "bleeding" by increasing the solvent stability of the core-shell particles. In this step, a protecting shell made of a condensation polymer is applied around the duromer resin (which includes e.g. one or several luminescent dyes and is ground to the desired grain size).

The duromer core is preferably an addition polymer, in particular polyurethane or polyurea.

While polyurethanes/polyureas in a reaction extrusion without special, dry reaction conditions (protective gas, vacuum, chemical additives, etc.) always have a certain porosity (see U.S. Pat. No. 3,755,222), the condensation of melamine formaldehyde resins ("MF resins") or of other polycondensation polymers runs without gas-induced pore formation, because none of the monomers releases carbon dioxide upon contact with water. On the other hand, the direct employment of MF resins as a core material or as the polymer carrying the dyes entails other technical disadvantages with respect to grindability, receptivity and processability.

Hence, the present variant combines the advantages of the simple and readily scalable production of polyaddition-resin-based security pigments with the chemical-resistant properties of melamine formaldehyde resins by condensing a protecting shell from melamine formaldehyde resin onto a polyaddition resin core loaded with luminescent dyes.

This process step makes it possible to protect soluble or unstable dyes against external influences, such as acid or base contact, contact with organic solvents, extreme climatic conditions or contact with reducing or oxidizing substances.

According to a preferred embodiment, in a first step the luminescent dye to be protected is incorporated into a duromer matrix, according to the print U.S. Pat. No. 5,795,379 A. For this, the feature substances can be extruded or kneaded together with the raw materials of the resin type used (for example a polyurethane resin or polyurea resin). The preferred concentration of the feature substances in the mixture lies in a region of 0.1% to 25%, particularly preferably in a region of 3% to 20% (weight percent). After termination of the extrusion process or kneading process the resins obtained and including the feature substances are ground into resin powder, the grain size being chosen according to the desired print application.

According to a preferred embodiment, for producing the core polymer particles dosed with luminescent dye, a mixture of a trimeric isocyanate monomer, preferably the isocyanurate trimer of isophorone diisocyanate, and various monoamines, diamines or triamines is heated to 150° C. to 250° C., preferably 180° C., in an industrial kneader and, in doing so, kneaded until hardening.

According to a further preferred embodiment, for producing the core polymer particles dosed with luminescent dye, a mixture of a trimeric isocyanate monomer, preferably the isocyanurate trimer of isophorone diisocyanate, and various monoamines, diamines and triamines is extruded at temperatures in a region of 5° C. to 250° C. with an increasing temperature profile in a screw extruder. Alternatively, as a core material there can be used any other three-dimensional crosslinked isocyanate-based duromers, for example polyurethane resins.

After the termination of the extrusion process or kneading process the obtained brittle resin powders including the feature substances are ground to the grain size corresponding to the desired application.

From this first cost-efficient and well scalable extrusion step or kneading step one obtains a printable powder in the suitable grain size. However, these pigments still possess a porous or accessible surface which makes the included organic dye attackable by external influences as acid or base contact, contact with organic solvents, extreme climatic conditions (such as for example warm, humid air) or contact with reducing or oxidizing substances. The porous surface is the inevitable result from the reaction of water from the air with the isocyanate groups of the monomers under the conditions of the desired polyaddition reaction (heat) upon which gaseous carbon dioxide arises.

It is the subject matter of the variant, among other things, to introduce a coating step which removes this disadvantage. In this second step, the addition polymer pigments obtained in the first step are encased with a protecting polymer layer. Preferably, the protecting polymer layer is a polycondensation polymer. Further preferably, the polycondensation polymer of the shell includes at least one same monomer as the polyaddition polymer of the core material, in order to promote a direct growth of the shell layer on the core material. Particularly preferably, this monomer is a melamine. The high functionality (three crosslinking groups per molecule) of melamine promotes a good growth and tight locking of the shell layer.

According to a preferred embodiment, the pigments to be coated and having a concentration ranging from 5 g/l to 50 g/l and a melamine formaldehyde prepolymer in a concentration ranging from 50 g/l to 250 g/l are stirred with a homogenizer at temperatures ranging from 60° C. to 80° C. at a pH value ranging from 3.5 to 6 for a duration ranging from one to four hours and thereby covered with a protecting shell. If the pH value is chosen too low, the formation of condensation germs in the reaction solution is promoted, which subsequently promotes the formation of condensation polymer particles besides the security pigments to be coated. If one chooses the pH value too high, the condensation reaction is slowed down needlessly, because the reactivity of the melamine against the formaldehyde in the basic media strongly decreases (see D. Braun, W. Krausse, Angew. Macromol. Chem. 118 (1983) 165).

For the procedure of coating it is unimportant which luminescent dye was worked into the polyaddition polymer of the core material, because the determining surface properties (e.g. charge, chemical binding sites etc.) are decisively determined by the duromer matrix of the core. Hence, a universal method for the encapsulation of feature substances is described herein.

According to further preferred embodiments, also other condensation polymers can be used for the coating, such as for example melamine phenol formaldehyde resins, phenol formaldehyde resins as well as related resin types such as melamine guanidine formaldehyde resins or phenol resorcin formaldehyde resins.

Variant 3: Capsule-Luminescent Pigments with Several Cores from Thermoplastics and an Addition Polymer Shell The present variant 3 includes an advantageous development of the method known from the print U.S. Pat. No. 5,795,379 A for incorporating luminescent dyes into a solid resin. In the present process, the dyes are extruded not directly with the components of the resin, but are dissolved in spheres (or particles) from thermoplastic polymer in a preceding step. The concentration of the dye dissolved in the polymer is here preferably in a region of 0.01% to 30%. By this preceding process step it is possible, compared to an organic dye directly extruded into a resin, to achieve the same brightness of the end product with a substantially smaller amount, e.g. 10% to 60%, of organic luminescent substance. Cost savings are achieved here by the lower dye amount.

The present variant does explicitly not deal with core-shell particles having a defined uniform geometry, and in particular not with core-shell particles having a core and a shell, but with core-shell particles having a non-uniform geometry with several cores and a shell.

Another advantage of this variant lies in the stabilization of the organic dyes dissolved in the thermoplastic polymer against aqueous acids and bases. A uniform encasing of the thermoplastic polymers with the encasing condensed resin is not decisive for this. The polymer including the dye (for example PMMA or PS) acts, as a result of its poor wettability with aqueous solutions, as a barrier against aqueous acids and bases and thus prevents the contact between the dissolved, labile dyes and the acids and bases.

Embedding the stable polymer spheres in a resin further enables the easy setting of the pigment grain size advantageous for the respective printing process by means of grinding, which entails an easy and cost effective scalability of the production process.

The manufacturing process has two stages. In the first manufacture step, the luminescent organic substance is dissolved in a thermoplastic polymer. For this, the polymer (for example PMMA or PS) together with the luminescent substance is dissolved in a suitable organic solvent (for example dichloromethane). So as to transition the polymer having the dissolved dye again into a solid form, one can choose from various synthesis pathways. Preferably, the polymer solution is dispersed in water with the help of a tenside (for example sodium dodecyl sulfate) and the solvent is removed from the mixture by simple evaporation. A further possibility is the precipitation of the polymer (including the dissolved dye) in diethyl ether with a subsequent grinding (in particular performed under cooling) into the desired grain size. The preferred grain size of the thermoplastic polymer particle is less than 7 µm, particularly preferably less than 3 µm.

The thermoplastic cores consist of thermoplastic polymers, preferably of a thermoplastic, non-crosslinked polymer. According to a preferred embodiment, the polymer of the core material consists of polymerized ethylene derivatives, further preferably of polystyrene (PS) or polyacrylates, including preferably polymethyl methacrylate (PMMA), polyvinyl acetate (PVAC), polyvinyl chloride (PVC), or polyacrylonitrile (PAN), or of a copolymer including one or several of the above-mentioned polymers, e.g. acrylonitrile butadiene styrene copolymer (ABS). According to a further preferred embodiment, the ethylene derivatives are polyethylene (PE), polypropylene (PP) or other polymers constructed from aliphatic carbon chains. According to a further preferred embodiment, the polymer of the core material consists of polycarbonates (PC), polyamides (PA), or polyesters, e.g. polyethylene terephthalate (PET).

The chain lengths of the polymers of the core material here preferably lie in a region of 1000 to 1 000 000 g/mol, particularly preferably in a region of 50 000 to 250 000 g/mol.

After the termination of the first synthesis step, polymer particles manufactured according to the above description are incorporated as luminescent substances into a duromer matrix in the second manufacture step. For this, the polymer particle can be extruded or kneaded together with the raw materials of the resin type used (for example polyurethane resin). The preferred concentration of the polymer particle in the mixture lies in a region of 0.1% to 25%, particularly preferably in a region of 3% to 20% (i.e. weight percent). After the termination of the extrusion or kneading process the obtained resin including the polymer particle will be ground to a resin powder, wherein the grain size can be set with respect to the desired printing process.

According to a preferred embodiment, for producing the duromer matrix dosed with the thermoplastic cores, addition polymers are used. Here, preferably a mixture of a trimeric isocyanate monomer, preferably the isocyanurate trimer of isophorone diisocyanate, and various monoamines, diamines or triamines are heated to 150° C. to 250° C., preferably 180° C., in an industrial kneader and, in doing so, kneaded until hardening.

According to a further preferred embodiment, for producing the duromer matrix dosed with the thermoplastic cores, a mixture of a trimeric isocyanate monomer, preferably the isocyanurate trimer of isophorone diisocyanate, and various monoamines, diamines or triamines is extruded at temperatures in a region of 5° C. to 250° C. in a screw extruder with an increasing temperature profile.

After the termination of the extrusion process or kneading process the obtained resin powder including the feature substances is ground to the grain size corresponding to the respective application.

According to a preferred embodiment, so-called plasticizers are admixed to the thermoplastic polymer particles, for example diethylhexyl adipate, dibutyl phthalate or diisononyl phthalate. As substance classes there can be employed here di-esters of phthalic acid, di-esters of the adipic acid and di-esters of the sebacic acid with long-chained mono alcohols (2-ethylhexanol, isononanol, decyl alcohol, fatty alcohols, benzyl alcohol, glycol ether), tri-ester of citric acid, phosphoric acid ester of long-chained aliphatic alcohols, dibenzoic acid ester of aliphatic alcohols, esters of fatty acids with aliphatic alcohols, di-esters of polyethylene glycol ethers, esters of resin acids with long-chained aliphatic alcohols, plasticizers on the basis of epoxidized fatty-acid ester or epoxidized oils, carbon plasticizers and chlorinated paraffin. This allows the mechanical properties of the polymer to be adjusted. In particular, the receptivity of the core material for particular luminescent dyes can be increased.

Preferably, 0.1 to 5 weight percent plasticizers relative to the mass of the core material, further preferably 0.2 to 2%, particularly preferably 0.3 to 0.6%, are admixed.

According to a particularly preferable embodiment, the thermoplastic cores consist of polymethyl methacrylate (PMMA) or polystyrene (PS) and the duromer matrix consists of an isocyanate-based addition polymer, the addition polymer being a polyurethane or polyurea.

Besides the stated preferred variants (variants 1 to 3), still further variants of capsule-luminescent pigments are theoretically conceivable, which differ in the type and kind of the polymers used for core and shell and in the type of manufacture.

Independent of the variant which was chosen for manufacturing the respective capsule-luminescent pigments of a luminescence ink system, in the following sometimes different "kinds of capsule-luminescent pigments" are mentioned when the respective dyes or the dye combinations differ in the core of the pigments. Example: Red luminescing capsule-luminescent pigments according to variant 1 with a first dye and green luminescing capsule-luminescent pigments according to variant 1 with a second dye are two different kinds of capsule-luminescent pigments, although they were respectively manufactured analogously according to variant 1.

Furthermore, the formulations "ink system", "luminescence ink system", and "pigment system" are utilized. The ink systems according to the invention are luminescent systems on the basis of special luminescent pigments, the capsule-luminescent pigments. Thus, luminescence ink systems according to the invention are also pigment systems. And pigment systems according to the invention having different color impressions of the luminescence emission of the luminescent pigments contained in the system respectively are, hence, also luminescence ink systems.

As already mentioned, one obtains a series of advantages, compared with the ink systems of the prior art, through the use of luminescence ink systems which are based on capsule-luminescent pigments.

With their similar size and surface condition there is achieved as a further advantage an adjustment of the printing properties between the individual capsule-luminescent pigments. An adjustment of the light fastness of the capsule-luminescent pigments can be achieved by suitable choice of the luminescent dyes or by a targeted mixture of luminescent dyes of different stabilities which are distributed in the core of the core-shell particles.

The capsule-luminescent pigments of the luminescence ink system furthermore have numerous application advantages. E.g. all the different inks manufactured therefrom possess the same printing properties, that is, e.g. no segregation of the different capsule-luminescent pigments occurs in the printing lacquer, no different behaviour of the luminescent inks or of the capsule-luminescent pigments occurs on the printing machine, and there is required only one single ink formulation system for all creatable luminescence color tones.

The capsule-luminescent pigments according to the invention generate colored (VIS) emissions upon UV irradiation, but preferably possess no (absorption-based) inherent color or only a weak inherent color, so that under normal conditions an imprint on the value document is not recognizable in room light.

For eliminating the disadvantages of the prior art, a luminescence ink system was developed which consists of at least two, preferably at least three capsule-luminescent pigments, which possess the same size, the same surface chemistry and a similar specific weight; (This solves the application problem, i.e. the continuity in manufacturing and printing the inks. Here, relative deviations in the region of <20% may occur in individual cases the different kinds of dyes and different dye loads, which normally will not impair the color incorporation, however);

possess a similar chemical stability (This solves the problem that the luminescent substances of the prior art behave differently upon solvent contact);

possess a similar light fastness (This solves the problem that the luminescent substances of the prior art behave differently in sunlight and under UV irradiation);

are freely mixable with each other (this allows that arbitrary mixed inks of the luminescence ink system can be formed).

The technical solution according to the invention is based in particular on the facts that the luminescent dyes are embedded in a polymer matrix (core), thereby, on the one hand, their relative luminescence being increased (lower concentration quenching compared with concentrated dye) and, on the other hand, a first protection against chemical attacks being effected;

the core is provided with an additional shell from a second, different polymer, thereby, on the one hand, preferably a complementary protection against chemical attacks being effected (the shell is stable against substances which could attack the core, the core is stable against substances which could attack the shell) and, on the other hand, the compatibility or the free mixability of all the pigments being ensured (the same surface);

preferably all the pigments possess the same (or similar) grain size (or grain size distribution).

The luminescence ink system according to the invention is based preferably on an RGB system, because in this way a greater color space can be covered and in particular by additive color mixture a white color impression can be produced. An RGB system is hence particularly suitable for true-color representations or other, more complex printed images.

The capsule-luminescent pigments are preferably printed, but in alternative embodiments they can also be incorporated in a common carrier material or the carrier material can be dyed therewith in order to form safety elements such as for example a security thread, security foils or a mottling fiber.

According to a preferred embodiment, there hence exist at least three different capsule-luminescent pigments whose emissions respectively correspond to the primary colors red, green and blue. In certain cases it can be advantageous to use in addition to these three pigments or instead of the red luminescing pigment a yellow luminescent pigment, thereby arising an alternative three-color system (yellow, green, blue) or an extended four-color system (red, yellow, green, blue). The reason for this is the high technical difficulty in manufacturing light-stable red emission colors without strong inherent coloring. Hence, the substitution of the red luminescing pigments, e.g. in yellow luminescing mixed inks can be advantageous. Likewise, the substitution of another color can also be advantageous depending on the required light stabilities and the printed image.

According to a further preferred embodiment, hence, three differently luminescing capsule-luminescent pigments or at least four differently luminescing capsule-luminescent pigments are employed, which do not necessarily correspond to the primary colors red, green and blue.

In certain cases, however, a reduced luminescence ink system is desirable, for example when on a value document there are only red and green luminescing regions or mixed colors derived therefrom such as e.g. yellow tones. In this case, a two-color system from red and green is sufficient and technically less elaborate or simpler to apply.

According to a further preferred embodiment, hence, two differently luminescing capsule-luminescent pigments are employed. In particular, the combinations of the capsule-luminescent pigments with the emission colors red with green, red with blue, green with blue, yellow with blue, yellow with green, and yellow with red are preferred here.

According to a preferred embodiment, the capsule-luminescent pigments form at at least one place on the value document in their mixture a white color impression of the emission. For example by the combination of red, green and blue luminescing capsule-luminescent pigments.

If several luminescent pigments form a mixture or if several luminescent pigments are printed on different places of the same value document, they must have a comparable stability behaviour in order to prevent that the color tone changes or the printed image becomes nonuniform. In the example of a printed white-red flag, by dissolving out the red luminescing dye the white luminescing part of the flag would change its color to turquoise and the red luminescing part would grow pale or disappear.

For preventing a change of the luminescence color impression by the migration of a dye, by the destruction of a dye through acids or bases, or by dissolving out a dye through organic solvents, the luminescent pigments used must have an exceptionally high chemical stability. According to the invention, preferably special core-shell particles (capsule-luminescent pigments) are used therefor.

Preferably, the core-shell particles of the different capsule-luminescent pigments differ only with respect to load amount and kind of the dye in the core and otherwise are almost entirely identical with respect to shell material and core material. This facilitates the common printability of the capsule-luminescent pigments and there arise technical advantages for the luminescence ink system, e.g. only one lacquer formulation for several different printing inks must be held in stock. Further application advantages are, e.g., the higher storage stability of the printing ink, because there occurs no segregation on account of different physical properties of the luminescent pigments, and an identical behaviour of the different luminescent pigments in the printing machine or while printed.

By contrast, with classical luminescent pigments the formulations of the printing inks must be respectively adjusted to the luminescent pigments contained therein, i.e. the supply and storage of a plurality of different formulations and formulation components are necessary. Likewise, the combination of luminescent pigments with incompatible properties is often problematic with classical luminescent pigments of the prior art.

Due to the similarity of the capsule-luminescent pigments according to the invention, these can be arbitrarily mixed with each other as powder before the incorporation into an ink to set a certain luminescence color tone, or different, already manufactured inks can be arbitrarily mixed with each other to set a certain luminescence color tone (see FIG. 1).

FIG. 1 shows the representation of an RGB color system with reference to the CIE color chart. Within the triangle (A: red color; B: green color: C: blue color) any luminescent color can be mixed from the capsule-luminescent pigments with the luminescence standard tristimulus values of the corner points.

Furthermore, with the core-shell structure it is achieved that the chemical stability of the capsule-luminescent pigments is independent of the chemical stability of the chosen luminescent dyes. If one carries out a qualitative stability test of printed patterns, a classification into the following levels is often used:

4: no visible alteration
3: minor alteration
2: significant alteration, less than 50% damaged
1: severe alteration, more than 50% damaged
0: element destroyed The qualitative evaluation of the stability is effected with the help of the above-mentioned levels 0-4 by viewing the excited proof with the eye. The quantitative evaluation is effected by measuring the emission spectrum with the help of a fluorescence spectrometer. As experience has shown, proofs with the level 4 ("no visible alteration") possess a luminescence intensity remaining after the test of more than 80% relative to the original luminescence intensity. This is referred to as a stability of more than 80% in the following.

To enable the stability of the capsule-luminescent pigments to be judged qualitatively and quantitatively, in the following an application-focused test method is described.

Test method A5 or A30:
  incorporating the capsule-luminescent pigments into an offset lacquer with a pigmentation of 15 weight percent with a three roll mill
  proofing the such obtained printing ink by offset printing with a weight of the proof of 2 $g/m^2$ onto bond paper ("bank note paper")
  drying the proof at 60° C. for 12 h immersing the proof (or a cut-off part of the proof) in the respective test substance, against which the stability of the proof is to be ascertained, for a period of 5 minutes (A5) or 30 minutes (A30)

removing the proof from the test substance and washing off adhering test substance with water drying the proof at 60° C. for 2 h The quantitative stability of the proof against the test substance results from the comparison of the intensity of the luminescence emission of the proof before and after the treatment with the test substance (or from the comparison of an untreated part of the proof with a treated part of the same print); stability=(intensity after treatment with solvent)/(intensity before treatment with solvent)

The capsule-luminescent pigments including luminescent dyes according to the present invention in proofs achieve the highest level 4 or a stability of >80% for application-relevant solvents, acids and bases, even when proofs of the same unprotected luminescent dye only achieve the lowest level 0.

According to a preferred embodiment, the highest stability level "no visible alteration" or a stability of >80%, preferably >90%, is present in the following application-relevant solvent tests according to test method A5, particularly preferably according to test method A30:

Determining the stability against polar organic solvents (test substance ethyl acetate), non-polar organic solvents (test substance toluene), aqueous acids (test substance HCl, 5 weight percent), aqueous bases (test substance NaOH, 2 weight percent), as well as aqueous redox-active solutions (test substance sodium hypochlorite solution, 5% active chlorine). Here, the exposure time is 5 or preferably 30 minutes to ensure that a sufficiently long contact between luminescent pigment and test substance takes place.

According to a further preferred embodiment, the stated stabilities of all the capsule-luminescent pigments of the luminescence ink system are given against the following application-relevant solvents:

ethanol
trichloroethylene
tetrachloroethylene
xylol
light gasoline
sodium sulphite solution (10 weight percent)
sulfuric acid (2 weight percent)
ammonia solution (10 weight percent)

Generally, it is to be noted that the printing lacquer used for the test or the substrate printed on must be stable in the test, this is generally satisfied by the lacquers and substrates which are used for the security printing of value documents. The stability of the printing lacquer/substrate can be checked, for example, with inert luminescent substances (e.g. inorganic phosphorus).

According to a preferred embodiment, the pigments of the luminescence ink system are stable even against especially aggressive chemical solvents for at least 5 minutes, e.g. acetone. In particular, acetone is capable of attacking most of the luminescence color imprints of the prior art.

Preferably, upon a quantitative determination of the luminescence strengths by machine the different capsule-luminescent pigments show, before and after an exposure to chemicals, an intensity deterioration of the luminescence intensity of less than 20%, preferably less than 10%, particularly preferably less than 5%.

In particular, the difference between the luminescence intensities of the capsule-luminescent pigments value with different luminescence emissions (kinds of capsule-luminescent pigments), normalized to the start, is less than 20 percentage points, preferably less than 10 percentage points, particularly preferably less than 5 percentage points. That is, the different pigments behave in the same way even upon the occurrence of a low intensity loss by exposure to chemicals and, hence, no recognizable alteration of the relative color ratios occurs. For example, after chemical treatment a first kind of capsule-luminescent pigment of the luminescence ink system (e.g. red) can still possess 96% of its initial intensity and a second kind of capsule-luminescent pigment of the luminescence ink system (e.g. green) still 95% of its initial intensity. They differ from each other only by one percentage point.

Here, two kinds of capsule-luminescent pigments within the framework of the test method A5 or A30 have a substantially same chemical stability, when test strips with proofs of both kinds of capsule-luminescent pigments withstand all chosen test solutions (preferably: ethyl acetate, toluene, HCl 5%, NaOH 2%, sodium hypochlorite 5% active chlorine) with in each case >80% remaining luminescence intensity, relative to the respective initial intensity. Here, for every test solution a new test strip is used.

According to a preferred embodiment, the color difference in the color impression of the luminescence emission caused by treatment with chemicals within the framework of the stability tests, relative to the color impression of the luminescence emission before the chemical treatment, is for pigment mixtures of the luminescence ink system $\Delta D<0.01$, further preferably $\Delta D<0.005$, particularly preferably $\Delta D<0.001$.

Here, $\Delta D$ designates the Euclidean distance of the x, y coordinates of the standard tristimulus values of the luminescence emission on the CIE standard color chart: $\Delta D=[(x_1-x_2)^2+(y_1-y_2)^2]^{0.5}$.

This similarity of the chemical stabilities of the different luminescent pigments achieves that no visible shift of the color tones, e.g. by a single luminescence color component dissolving from a mixture, can occur.

To avoid a change of the luminescence color tone through different light fastnesses of the capsule-luminescent pigments, the different capsule-luminescent pigments must have a sufficiently high and sufficiently similar light fastnesses.

The light fastness is determined here via the European blue wool scale usual for the light fastness determination of absorption inks, e.g. analogous to the standard EN ISO 105-B01:1999, instead of the (absorbent) color impression, however, the intensity of the luminescence emission at the different points of the blue wool scale being determined. A point of the blue wool scale is deemed to be achieved, when after a treatment still more than 50% of the original luminescence intensity can be measured.

To enable the light fastness of the capsule-luminescent pigments to be judged quantitatively, in the following an application-focused test method is described.

Test Method B:

incorporating the capsule-luminescent pigments into an offset lacquer with a pigmentation of 15 weight percent with a three roll mill proofing the such obtained printing ink by offset printing with a weight of the proof of 2 g/m² onto bond paper ("bank note paper")

drying the proof at 60° C. for 12 h inserting the proof into a Xenon light test chamber (or equivalent light fastness determination device) and irradiation according to the European blue wool scale for the desired blue wool scale level The quantitative light fastness of the proof arises from the comparison of the intensity of the luminescence emission of the proof before and after treatment (or from the comparison of an untreated part of the proof with a treated part of the same proof); normalized intensity at blue wool scale level=(intensity at blue wool scale level)/(intensity before treatment)

Preferably, all capsule-luminescent pigments of the luminescence ink system achieve at least blue wool scale 3, that is, at blue wool scale 3 they still possess a normalized intensity of more than 50%.

Preferably, the different kinds of capsule-luminescent pigments have substantially the same light fastness, i.e. the intensities normalized to the initial value of the different capsule-luminescent pigment kinds of the luminescence ink system differ at blue wool scale 3, according to test method B, from each other by less than 30 percentage points, further preferably less than 20 percentage points, particularly preferably less than 10 percentage points. This ensures that the correct color impression of mixed inks is still present e.g. even after long solar radiation or after strong UV irradiation by machine.

For example, at blue wool scale 3 a first kind of capsule-luminescent pigment of the luminescence ink system can still possess 61% of its initial intensity and a second kind of capsule-luminescent pigment of the luminescence ink system can still possess 65% of its initial intensity. They thus differ by 4 percentage points from each other.

In certain cases, however, various luminescent dyes show a different course in their light stability. For example, after a short irradiation (blue wool scale 1) a dye can show a significant intensity deterioration and then stabilize, while another dye has a continuous intensity deterioration, so that at the end both dyes again possess the same relative intensity, but for an interim period they differed from each other. In this case, upon a short irradiation duration one would perceive a shift of the luminescence color tone, which disappears upon longer irradiation.

To avoid this effect, preferably the intensities of the different capsule-luminescent pigments normalized to the initial value differ according to test method B at blue wool scale 1 by less than 30 percentage points, further preferably less than 20 percentage points, particularly preferably less than 10 percentage points. Furthermore, preferably the intensities of the different capsule-luminescent pigments normalized to the initial value differ according to test method B at blue wool scale 2 by less than 30 percentage points, further preferably less than 20 percentage points, particularly preferably less than 10 percentage points.

According to a preferred embodiment, the color difference of the color impression of the luminescence emission at blue wool scale 3, relative to the color impression of the luminescence emission before the blue wool scale test, according to test method B for capsule-luminescent pigment mixtures of the luminescence ink system is $\Delta D<0.03$, preferably $\Delta D<0.02$, particularly preferably $\Delta D<0.01$.

According to a further preferred embodiment, the color difference for capsule-luminescent pigment mixtures of the luminescence ink system according to test method B at blue wool scale 2 is $\Delta D<0.03$, preferably $\Delta D<0.02$, particularly preferably $\Delta D<0.01$. According to a further preferred embodiment, the color difference for capsule-luminescent pigment mixtures of the luminescence ink system according to test method B at blue wool scale 1 is $\Delta D<0.03$, preferably $\Delta D<0.02$, particularly preferably $\Delta D<0.01$.

Here, $\Delta D$ designates the Euclidean distance of the x, y coordinates of the standard tristimulus values of the luminescence emission on the CIE standard color chart: $\Delta D=[(x_1-x_2)^2+(y_1-y_2)^2]^{0.5}$.

This similarity of the light fastness of the different luminescent pigments achieves that no visible shift of the color tones, e.g. by a single luminescence color component bleaching out from a mixture, can occur.

According to a preferred embodiment, in at least one capsule-luminescent pigment a mixture of several luminescent dyes with different courses of the light stability is employed for adapting the course of the light stability. For example, a mixture of a continuously stable dye and a small portion of an unstable dye which already bleaches out at blue wool scale 1 behaves identically to a single dye which shows a low deterioration of the luminescence intensity upon short irradiation duration and then remains stable.

According to a further preferred embodiment, a mixture of two kinds of capsule-luminescent pigments with substantially the same color impression, but different light fastnesses are employed to achieve in sum substantially the same light fastness as a third kind of capsule-luminescent pigment with different color impression of the luminescence emission.

Thus, for the different capsule-luminescent pigments for two different blue wool scale levels identical normalized luminescence intensities are achieved and for the other times approximately adapted. The viewer thus sees no significant differences in the luminescence intensities and color tones of the different capsule-luminescent pigments or the mixtures thereof.

Furthermore, it is possible to influence the light stability of a first luminescent dye by adding a second luminescent dye, even when the excitation radiation is only capable of exciting the first dye. For this purpose, the second dye must be capable of taking over the excitation energy of the first dye by energy transfer, which is why the light fastness of the first dye significantly increases.

According to a preferred embodiment, in at least one capsule-luminescent pigment an energy transfer system between two dyes is utilized. One of the two dyes is preferably a dye excitable in the UV region which emits in the visible region, and the other of the two dyes is a dye excitable in the visible region which emits in the visible region.

According to a preferred embodiment, the luminescent dye is a fluorescence dye. According to a further preferred embodiment, the luminescent dye is a phosphorescence dye. According to a further preferred embodiment, the luminescent dye is a dye excitable in the UV region which emits in the visible spectral region. According to a further preferred embodiment, it is a dye excitable in the visible spectral region which emits in the visible spectral region. The luminescent dyes can be purely organic molecules as well as metalorganic complexes. Explicitly excluded are purely inorganic luminescent substances. Although these often have excellent light stabilities and chemical stabilities, they do not achieve the luminescence intensity of organic luminescent dyes.

According to a preferred embodiment, two or more luminescent dyes are mixed to establish an energy transfer system or FRET system in which after excitation the first dye can give off its excitation energy partially or completely to the second dye. In case of such a FRET system, one of the involved dyes is excitable preferably in the UV region and emits in the visible spectral region, while the other dye is excitable in the visible spectral region and emits in the visible spectral region.

Examples of substance classes of luminescent dyes which are UV-excitable or excitable in the visible spectral region and emit in the visible spectral region are purely organic luminescent dyes and luminescent metal complexes. Possible dye classes are, for example, diarylpolyenes, diarylethenes, arylacetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones as well as rare-earth metal complexes, such as e.g. β-diketonate rare-earth metal complexes or dipicolinate rare-earth metal complexes, and here preferably neutrally charged rare-earth metal complexes. Other organic luminescent dye classes can also be employed.

In particular, as a dye class for dyes excitable in the visible spectral region which emit in the visible there are preferably used perylene dyes because of their high light stability.

Examples of FRET systems are, e.g., mixtures from a green-yellow excitable fluorescence dye and a green-yellow emitting fluorescence dye, for example a mixture with a weight ratio of 1:15 from 2,9-bis(2,6-diisopropylphenyl) anthra[2,1,9 def:6,5,10 d'e'f']diisochinolin-1,3,8,10(2H,9H)-tetraone ($C_{48}H_{42}N_2O_4$, a green-excitable perylene dye which possesses an orange luminescence emission, in the further designated as "F-orange") and N-(2-(4-oxo-4H-benzo[d][1,3]oxazine-2-yl)phenyl)naphthalene-2-sulfonamide ($C_{24}H_{16}N_2O_4S$, a UV-excitable dye which has a green luminescence emission, in the following designated as "F-green").

A FRET system can also serve to read out a forensic component in a luminescent pigment. Thus, the acceptor dye can be excited not only by an energy transfer of the donor dye, but also a direct excitation of the acceptor dye can lead to the luminescence thereof. For example, a mixture of F-orange and F-green can be excited, on the one hand, in the UV-A region, e.g. with 365 nm (excitation of the F-green followed by energy transfer to F-orange). On the other hand, for a forensic test the F-orange can also be excited directly, for example, by light of the wavelength 525 nm. The direct excitation of the acceptor substance can thus be used to distinguish FRET systems from other dye systems, and offers an additional security level which can be evaluated, e.g. in a laboratory or automatically by sensors.

According to a preferred embodiment, the capsule-luminescent pigment hence includes an energy transfer system (FRET system), preferably a FRET system from a UV-excitable dye as a donor and a dye excitable in the visible region as an acceptor. Preferably, the acceptor is a perylene dye. Preferably, the acceptor is used as a forensic marker.

According to a preferred embodiment, the capsule-luminescent pigments of the luminescent dye system are excitable with UV-A radiation (i.e. in the wavelength region of 315 nm to 380 nm), in particular with 365 nm. According to a further preferred embodiment, the capsule-luminescent pigments of the luminescent dye system are excitable with UV-B radiation (i.e. in the wavelength region of 280 nm to 315 nm), in particular with 311 nm. According to a further preferred embodiment, the capsule-luminescent pigments of the luminescent dye system are excitable with UV-C radiation (i.e. in the wavelength region of 100 nm to 280 nm), in particular with 254 nm. According to a further preferred embodiment, two dye systems are produced, which can be excited separately in the UV-A (preferably 365 nm) and UV-C (preferably 254 nm) and thereby showing different colors, respectively. For example, three printed places of a value document appear under UV-A red, green and blue, respectively, the same places appear under UV-C irradiation in other colors, e.g. yellow, blue, violet. This is realizable with two different methods. On the one hand, in one printing ink there can be present a mixture of different, respectively UV-A- or UV-C-excitable capsule-luminescent pigments. On the other hand, in one printing ink there can be included a capsule-luminescent pigment which includes a mixture of different, respectively UV-A- or UV-C-excitable dyes.

According to a further preferred embodiment, at least one capsule-luminescent pigment of the luminescence ink system is excitable with UV-A radiation as well as with UV-C radiation. Preferably, the capsule-luminescent pigment upon excitation with UV-A and UV-C radiation respectively shows different emission spectra.

Particularly preferably, all the capsule-luminescent pigments of the luminescence ink system are excitable both with UV-A radiation and with UV-C radiation, and upon excitation with UV-A and UV-C radiation respectively show different emission spectra According to a further preferred embodiment, at least one capsule-luminescent pigment of the luminescence ink system is excitable both with UV-A radiation and with UV-C radiation, and upon excitation with UV-A and UV-C radiation respectively shows a different emission spectrum, and at least one further capsule-luminescent pigment of the luminescence ink system upon excitation with UV-A and UV-C radiation respectively shows the same emission spectrum.

According to a further preferred embodiment, at least one capsule-luminescent pigment of the luminescence ink system is excitable with UV-A radiation as well as with UV-C radiation. Preferably, the capsule-luminescent pigment upon excitation with UV-A and UV-C radiation respectively shows the same emission spectrum.

Particularly preferably, all the capsule-luminescent pigments of the luminescence ink system are excitable both with UV-A radiation and with UV-C radiation, and upon excitation with UV-A and UV-C radiation respectively show the same emission spectra.

Luminescence ink systems with differently excitable components are generally well known in the prior art (see e.g. EP 2602119 A1).

The luminescent dyes employed in the core of the core-shell particles of the capsule-luminescent pigments can be fluorescent (quickly decaying) or phosphorescent (slowly decaying) dyes.

Most of the purely organic dyes are fluorophores and emit after excitation already after a few nanoseconds. However, some dyes may develop, e.g. after excitation, an excited triplet state which only slowly, i.e. phosphorescently, transitions into the initial state by light emission. Likewise, many metalorganic complexes show a slow decay time in the region of microseconds to milliseconds. The scientific classification of different substances into fluorescence and phosphorescence, however, is controversially discussed and not uniformly defined. Hence, for the purposes of this invention the differentiation in fluorescent and phosphorescent substances is hence based solely on the length of the decay time of the luminescence emission.

The aspect of the decay time is of importance for value documents in particular for the machine readability on automated sensors. Here, preferably the phosphorescence of the imprints of the value document is measured, because this can be measured independently of the disturbing fluorescence of the background and independently of the impurities etc.

Within the scope of this invention, substances with a decay time of >50 μs, hence, are deemed to be phosphorescent, and substances with a decay time of <50 μs as fluorescent, because the border for an easy distinguishability by machine lies in this region.

According to a preferred embodiment, at least one of the luminescent dyes employed in the luminescence ink system is a slowly decaying (phosphorescent) dye, preferably a dye with a decay time of more than 50 μs, particularly preferably more than 100 In particular, it is preferably a rare-earth complex with a decay time of more than 100 μs.

Independently of whether the fluorescence or phosphorescence of the printed image is evaluated by machine, several application advantages arise here through the use of capsule-luminescent pigments. Only through the similar light fastnesses and chemical stabilities of all the capsule-luminescent pigments of the luminescence ink system according to the invention a reliable machine evaluation is possible. This enables for the first time a reliable use of the spectral intensity ratios of a fluorescence print as a machine-readable authenticity feature.

For example, no drifts due to ageing are observed upon examining the different color components, i.e. the luminescence color ratios remain constant. In particular, it cannot occur that a color component is no longer detectable because of having grown pale or because of the impact of a solvent. Hence, there is always measured the correct entire printed image, which significantly simplifies an authenticity determination. Upon the use of a mixture of the luminescent pigments according to the prior art, which respectively possess different properties, however, often false signals are generated, e.g. because a luminescence marking was smeared by the impact of solvents (e.g. upon a lacquering of the bank note for increasing the soiling resistance) and hence the marking does no longer have the position and size expected by the sensor, or because due to environmental factors, such as humidity and solar radiation, an individual color component was destroyed and hence the measured luminescence printed image does not match the expected luminescence printed image.

According to a preferred embodiment, the capsule-luminescent pigments of the luminescence ink system possess no or only a weak (absorption-based) inherent coloring. This enables a printed image to be applied on the value document, which for the human eye is not or hardly visible and becomes visible only upon UV irradiation. Likewise, the remaining (absorption-based) colored image of the value document is not disturbed by the imprint of the luminescent components. For example, on a bank note there can be printed in an otherwise white or bright region of the bank note an invisible symbol which does not strike the viewer at daylight, but is clearly recognizable in the dark upon UV irradiation. Preferably, the (absorption-based) color difference caused by the capsule-luminescent pigment (e.g. in comparison to an imprint without capsule-luminescent pigment) is ΔE<10, further preferably ΔE<5, particularly preferably ΔE<2.

Here, ΔE designates the Euclidean distance of the (L*, a*, B*) coordinates of the two (absorption-based) color locations.

Typical application conditions for luminescent inks are present, e.g., with 15% luminescent pigment in the printing lacquer at 0.5-8 g/m² proof thickness, preferably 2.0 g/m² proof thickness.

According to a further preferred case of embodiment, the capsule-luminescent pigments of the luminescence ink system possess an (absorption-based) inherent coloring. The imprint with the luminescent components is then visible, and e.g. can be part of the remaining (absorption-based) colored image of the value document.

According to a further preferred embodiment, the printing ink of the capsule-luminescent pigments includes additional (non-luminescent, absorption-based) color pigments or dyes to color the imprint in targeted fashion, or the capsule-luminescent pigment is added to a "normal" printing ink. Thus, no additional printing step is necessary, instead the luminescent pigment is applied simultaneously with the rest of the colored image of the bank note. For example, luminescent pigments are often added to the printing ink for the numbering of the serial number of a bank note, or are present in other colored markings of the value document.

According to a preferred case of application, the (absorption-based) body color and the color impression of an imprint of the luminescence ink system, which is emitted by luminescence, are the same.

This enables the imaging of, e.g., a multicolor flag or a portrait of a state's person in color on the value document, and then upon irradiation with UV light recognizing the same colored image through the luminescence in the dark.

According to a preferred case of application, the capsule-luminescent pigments of the luminescence ink system have uniform grain sizes which can be set depending on the print application. For example, pigments for the employment in offset printing applications preferably possess a grain size of (d99)<12 μm. For the employment in screen printing applications, the pigments preferably possess a grain size of (d99)<25 μm. For the employment in steel intaglio-printing applications, the pigments preferably possess a grain size of (d99)<6 μm.

According to a preferred embodiment, the grain sizes (d99) of the respective kinds of capsule-luminescent pigments of the luminescence ink system with different luminescence emissions differ from each other by less than 30%, further preferably by less than 20%, particularly preferably by less than 10%.

According to a further preferred embodiment, the grain sizes (d50) of the respective kinds of capsule-luminescent pigments of the luminescence ink system with different luminescence emissions differ from each other by less than 30%, further preferably by less than 20%, particularly preferably by less than 10%.

According to a preferred embodiment, still further pigments and/or admixtures are employed, besides the capsule-luminescent pigments, in order to achieve certain effects in the application. For example, into the printing inks there can be admixed, besides the capsule-luminescent pigments, absorber pigments (e.g. in the IR or in the visible spectral region) in order to set the inherent color or to act as an additional security feature. Furthermore, additional luminescent pigments can be added, for example, inorganic phosphorous or NIR-luminescent pigments which enhance the machine readability or can act as an additional security feature. Further typical additives are, e.g., brighteners, stabilizers, emulsifiers, substances adjusting the refractive index, diluent, scents, etc.

Further preferred embodiments of the luminescence ink system according to the invention are listed below:

At least two, preferably at least three capsule-luminescent pigments with respectively different emission spectra, preferably different color impressions of the luminescence emission. In a preferred case of application, the capsule-luminescent pigments are present separate from each other, for example, respectively one red luminescing and one blue luminescing capsule-luminescent pigment. In a further preferred case of application, the capsule-luminescent pigments are present mixed with each other, e.g. a mixture of one red luminescing and one blue luminescing capsule-luminescent pigment.

At least one luminescence ink concentrate with altogether at least two, preferably at least three capsule-luminescent pigments with respectively different emission spectra, preferably different color impressions of the luminescence emission.

In a preferred case of application, at least two luminescence ink concentrates are present, which respectively contain at least one kind of the capsule-luminescent pigments. For example, a first ink concentrate with red luminescing capsule-luminescent pigments and a second ink concentrate with blue luminescing capsule-luminescent pigments. In a further preferred case of application, at least one luminescence ink concentrate is present, which contains at least two kinds of the capsule-luminescent pigments. For example, an ink concentrate which contains a mixture of red luminescing capsule-luminescent pigments and blue luminescing capsule-luminescent pigments.

The luminescence ink concentrates are used for compounding the color tones or the luminescence color tones of different luminescing printing inks.

At least one printing ink with a total of at least two, preferably at least three, capsule-luminescent pigments according to the invention. In a preferred case of application, the capsule-luminescent pigments are present separately in different printing inks, for example, respectively one printing ink with a red luminescing capsule-luminescent pigment and one printing ink with a blue luminescing capsule-luminescent pigment. In a further preferred case of application, the different capsule-luminescent pigments are present mixed in the same printing ink, e.g. a printing ink with a mixture of one red luminescing and one blue luminescing capsule-luminescent pigment.

A value document with at least two, preferably at least three different capsule-luminescent pigments. In a preferred case of application, the capsule-luminescent pigments are applied at different places on the value document, for example one imprint with red luminescing capsule-luminescent pigments and one imprint with blue luminescing capsule-luminescent pigments. In a further preferred case of application, the capsule-luminescent pigments are applied on at least one same place of the value document, for example an imprint of a mixture of red luminescing and blue luminescing capsule-luminescent pigments.

The invention will hereinafter be illustrated on the basis of preferred embodiment examples.

Embodiment Example 1: Pigment System of Red and Green Capsule-Luminescent Pigments with Thermoplastic Core and Condensation-Polymer Shell As a red luminescing pigment a core-shell particle with a polymethyl-methacrylate core and a melamine-formaldehyde shell is used, which as dyes dissolved in the core includes a mixture of the three dyes N-(2-(4-oxo-4H-benzo[d][1,3]oxazine-2-yl)phenyl)naphthalene-2-sulfonamide ($C_{24}H_{16}N_2O_4S$), 2,9-Bis(2,6-diisopropylphenyl)-5,6,12,13-tetraphenoxyanthra[2,1,9-def:6,5,10-d'e'f']diisochinolin-1,3,8,10(2H,9H)-tetraone ($C_{72}H_{58}N_2O_8$), and Eu(TTA)$_3$(TPPO)$_2$ (TTA=thenoyltrifluoroacetone; TPPO=triphenylphosphine oxide).

It corresponds to a capsule-luminescent pigment according to the preferred variant 1.

The luminescent dye Eu(TTA)$_3$(TPPO)$_2$ here serves in particular for adapting the light fastness at blue wool scale 1 between the red luminescing and green luminescing capsule-luminescent pigments of this embodiment example.

Manufacturing the Red Luminescent Pigment:

27 g of polymethyl methacrylate (PMMA) of average mol mass 100000 g/mol, 1500 mg N-(2-(4-oxo-4H-benzo[d][1,3]oxazine-2-yl)phenyl)naphthalene-2-sulfonamide, ($C_{24}H_{16}N_2O_4S$), 100 mg 2,9-Bis(2,6-diisopropylphenyl)-5,6,12,13-tetraphenoxyanthra[2,1,9-def:6,5,10-d'e'f']diisochinolin-1,3,8,10(2H,9H)-tetraone ($C_{72}H_{58}N_2O_8$), 100 mg Eu(TTA)$_3$(TPPO)$_2$ and 250 mg dibutyl phthalate are dissolved under stirring in 500 g of dichloromethane (solution A).

78 g melamine and 111 g paraformaldehyde are stirred in 1000 g water at 60° C. for 60 minutes, thereby forming a clear solution. The solution is filtered via a filter paper to remove possibly present nondissolved particles (solution B).

In 2475 g of water 25 g of sodium dodecyl sulfate are dissolved (solution C).

Solution A is added to solution C and dispersed for 30 seconds with a disperser tool (Ultraturrax). During this time, 200 mL solution B and 10 mL acetic acid are added. Subsequently, the dispersion is further stirred with a magnetic stirrer.

After 2 h of stirring at room temperature the dispersion is heated to 39° C. and held at this temperature for 3 h to evaporate the dichloromethane. Subsequently, further 200 mL of the solution B are added and the temperature is increased to 70° C. This temperature is held for further 3 h. The obtained particles are separated from the solution, washed with water and dried at 60° C.

Approx. 60 g of a pigment fluorescing red upon irradiation with UV light of the wavelength 365 nm are obtained.

As a green luminescing pigment there is used a core-shell particle with a polymethyl-methacrylate core and a melamine-formaldehyde shell, which includes N-(2-(4-oxo-4H-benzo[d][1,3]oxazine-2-yl)phenyl)naphthalene-2-sulfonamide ($C_{24}H_{16}N_2O_4S$) as a dye dissolved in the core.

It corresponds to a capsule-luminescent pigment according to the preferred variant 1.

Manufacturing the Green Luminescent Pigment:

27 g of polymethyl methacrylate (PMMA) of the average mol mass 100000 g/mol, 1500 mg N-(2-(4-oxo-4H-benzo[d][1,3]oxazine-2-yl)phenyl)naphthalene-2-sulfonamide ($C_{24}H_{16}N_2O_4S$) and 250 mg dibutyl phthalate are dissolved under stirring in 500 g of dichloromethane (solution A).

78 g melamine and 111 g paraformaldehyde are stirred in 1000 g water at 60° C. for 60 minutes, thereby forming a clear solution. The solution is filtered via a filter paper to remove possibly present nondissolved particles (solution B).

In 2475 g of water 25 g of sodium dodecyl sulfate are dissolved (solution C).

Solution A is added to solution C and dispersed for 30 seconds with a disperser tool (Ultraturrax). During this time, 200 mL solution B and 10 mL acetic acid are added. Subsequently, the dispersion is further stirred with a magnetic stirrer.

After 2 h of stirring at room temperature the dispersion is heated to 39° C. and held at this temperature for 3 h to evaporate the dichloromethane. Subsequently, further 200 mL of the solution B are added and the temperature is increased to 70° C. This temperature is held for further 3 h.

The obtained particles are separated from the solution, washed with water and dried at 60° C.

Approx. 60 g of a pigment green fluorescing upon irradiation with UV light of the wavelength 365 nm are obtained.

Both pigments luminesce under UV excitation with 365 nm. When in the following one speaks of these pigments or of inks derived therefrom or proofs "luminescing", this means that they luminesce under UV excitation with 365 nm.

1a) Powder Mixture of Different Luminescent Pigments 50 g of the red luminescing pigment and 50 g of the green luminescing pigment are mixed with each other. The mixture luminesces yellow.

1b) Printing Ink from Powder Mixture with Different Luminescent Pigments

The powder mixture of embodiment example 1a is worked into offset printing lacquer (Sicpa Holding SA) with the help of a three roll mill. The pigmentation degree of the ink here is 15 weight percent. The obtained offset printing ink luminesces yellow.

On account of the similarity of the pigments included in the mixture there is no fractionation of the pigments during or after the ink manufacturing process.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

1c) Printing Ink of Different Printing Inks

A first printing ink is created with the red luminescing pigment, by this being worked into offset printing lacquer (Sicpa holding SA) with the help of a three roll mill. The pigmentation degree of the printing ink is 15 weight percent. The ink luminesces red.

A second printing ink is created with the green luminescing pigment, by this being worked into offset printing lacquer (Sicpa holding SA) with the help of a three roll mill. The pigmentation degree of the printing ink is 15 weight percent. The ink luminesces green.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

By mixing same portions of the first and the second printing ink there is created a third printing ink. This luminesces yellow. It does not differ in terms of content from the printing ink in embodiment example 1b. On account of the similarity of the pigments used in the first and second color these behave identically in the printing ink and can be mixed without incompatibilities.

Therefore it is possible to create mixed inks either from powder mixtures (1b) or from the primary colors of the pure pigments (1c).

1d) Value Document with Separate Imprint from Two Different Luminescent Pigments The red luminescing ink and the green luminescing ink of embodiment example 1c are respectively printed onto different places of the same value document. The proof thickness here is 2 g/m$^2$. The proofs of the two inks here form two strips printed side by side on the value document, with the respective size of 2×4 cm$^2$, which luminesce red and green, respectively.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after achievement of the blue wool scale rating is represented in the following table.

| Blue wool scale | Residual intensity red [%] | Residual intensity green [%] | Difference [percentage points] |
|---|---|---|---|
| Initial value | 100 | 100 | 0 |
| 1 | 90 | 88 | 2 |
| 2 | 82 | 79 | 3 |
| 3 | 72 | 67 | 5 |

After the same action of light the printed inks lose approximately the same amount of luminescence intensity. Hence, the relative ratio of the emission intensity of the two colors does not change for the eye. The entire security feature can be uniformly recognized and a machine evaluation of the constant intensity ratio of the different emissions is possible.

Further such printed value documents are tested for their chemical stability according to test method A30 or A5.

| Test substance | Residual intensity red [%] | Residual intensity green [%] | Difference [percentage points] |
|---|---|---|---|
| Ethyl acetate, 30 minutes | 99 | 99 | 0 |
| Toluene, 30 minutes | 98 | 99 | 1 |
| Hydrochloric acid 5%, 30 minutes | 100 | 99 | 1 |
| Sodium hydroxide 2%, 30 minutes | 98 | 98 | 0 |
| Sodium hypochlorite, 5% active chlorine, 30 minutes | 99 | 98 | 1 |
| Acetone, 5 minutes | 99 | 99 | 0 |

The proofs show on account of the similar chemical stability of the luminescent pigments no great relative differences in the remaining luminescence intensity. Hence, the relative ratio of the emission intensity of the two colors does not change for the eye.

The entire security feature can be uniformly recognized and a machine evaluation of the constant intensity ratio of the different emissions is possible.

1e) Value Document with Imprint of a Mixture of Two Different Luminescent Pigments The yellow luminescing mixed ink of embodiment example 1c is printed onto a value document. The proof thickness here is 2 g/m$^2$. The proof here forms a square printed on the value document and has the size 4×4 cm$^2$, which luminesces yellow.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission (ΔD) relative to the initial value after achievement of the blue wool scale rating is represented in the following table.

| Blue wool scale | Tristimulus values emission | ΔD |
|---|---|---|
| Initial value | x = 0.4258; y = 0.4775 | — |
| 1 | x = 0.4271; y = 0.4760 | 0.00198 |
| 2 | x = 0.4280; y = 0.4749 | 0.00340 |
| 3 | x = 0.4237; y = 0.4811 | 0.00416 |

On account of the similar light fastness of the two employed pigments the color impression of the emission of the mixed ink hardly alters. A viewer will hence perceive no alteration of the color tone of the luminescence, even when the value document was exposed, e.g. to solar radiation for a long time.

The security feature can thus be clearly recognized by a viewer and a machine evaluation of the spectrum or of the tristimulus value is possible.

Further such printed value documents are tested for their chemical stability according to test method A30. The change of the color impression of the emission (ΔD) relative to the value before the chemical treatment of the proof is represented in the following table.

| Test substance | Tristimulus values emission | ΔD |
|---|---|---|
| (before treatment) | x = 0.4258; y = 0.4775 | — |
| Ethyl acetate, 30 minutes | x = 0.4259; y = 0.4773 | 0.00022 |
| Toluene, 30 minutes | x = 0.4254; y = 0.4781 | 0.00072 |
| Hydrochloric acid 5%, 30 minutes | x = 0.4262; y = 0.4770 | 0.00064 |
| Sodium hydroxide 2%, 30 minutes | x = 0.4260; y = 0.4772 | 0.00036 |
| Sodium hypochlorite, 5% active chlorine, 30 minutes | x = 0.4262; y = 0.4769 | 0.00072 |

The proofs show, on account of the similar chemical stability of the luminescent pigments which were employed in the mixture, no shift of the color tone of the emission. Hence, the perceived color tone of the luminescence of the proof does not change for the eye even after the treatment with solvents.

The security feature can thus be clearly recognized by a viewer and a machine evaluation of the spectrum or of the tristimulus value is possible.

1f) Imprint with True-Color Fluorescence

In addition to the red and green ink of embodiment example 1c, a third, blue luminescing printing ink is manufactured. This is a pigment analogously structured, which includes, relative to the core mass, 5 weight percent of the dye 4,4'-Bis(benzoxazole-2-yl)stilbene($C_{28}H_{18}N_2O_2$) and was analogously worked into an offset printing ink.

All three inks luminesce upon UV irradiation with 365 nm.

With the three inks a true-color image is printed onto a value document, e.g. an RGB color circle with a white dot in the center. By combining the three primary colors red, green and blue arbitrary mixed colors or color gradations can be generated here by superimposition of the printing inks. Due to the similar light fastness and chemical stability of the individual primary colors the color tones of the mixed inks and the color gradations remain unchanged in their color tone also with solar irradiation or treatment with solvents.

Counterexample 1: Luminescence System of Red and Green Pigments without Adjusted Stabilities As a red luminescing pigment there is used a PMMA particle without MF shell, which is loaded with $Eu(TTA)_3(TPPO)_2$. It is structured similarly to the red luminescing pigment of the embodiment example 1, but possesses no additional protecting shell (and hence no adjusted chemical stability) and no adjusted dye composition (and hence no adjusted light fastness).

As a green luminescing pigment there is used the same capsule pigment as in the embodiment example 1.

Both pigments luminesce under UV excitation with 365 nm. When in the following one speaks of these pigments or of inks derived therefrom or proofs "luminescing", this means that they luminesce under UV excitation with 365 nm.

The two pigments are incorporated into printing inks and printed onto value documents, analogously to the steps in embodiment example 1.

Counterexample for "Value Document with Separate Imprint of Two Different Luminescent Pigments"

Analogously to the embodiment example 1d, onto a value document there are printed two strips lying side by side having the respective size of 2×4 cm² and respectively luminescing red and green.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after the achievement of the blue wool scale rating is represented in the following table.

| Blue wool scale | Residual intensity red [%] | Residual intensity green [%] | Difference [percentage points] |
|---|---|---|---|
| Initial value | 100 | 100 | 0 |
| 1 | 27 | 89 | 62 |
| 2 | 14 | 80 | 66 |
| 3 | 9 | 68 | 59 |

The proofs of the two colors significantly differ in their light fastness and lose differently sized portions of their luminescence intensity upon irradiation with light. Hence, the relative ratio of the emission intensity of the two inks significantly changes for a viewer. The red luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Further such printed value documents are tested for their chemical stability according to test method A30.

| Test substance | Residual intensity red [%] | Residual intensity green [%] | Difference [percentage points] |
|---|---|---|---|
| Ethyl acetate, 30 minutes | 1 | 99 | 98 |
| Toluene, 30 minutes | 0 | 99 | 99 |
| Hydrochloric acid 5%, 30 minutes | 70 | 100 | 30 |
| Sodium hydroxide 2%, 30 minutes | 65 | 98 | 33 |
| Sodium hypochlorite, 5% active chlorine, 30 minutes | 40 | 98 | 58 |
| Acetone, 5 minutes | 0 | 99 | 99 |

The proofs of the two inks show significantly different chemical stabilities. Hence, the relative ratio of the emission intensity of the two colors does significantly change for the eye. The red luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Counterexample for "Value Document with Imprint of a Mixture of Two Different Luminescent Pigments"

Onto a value document there is printed, analogously to the embodiment example 1e, a square of the size 4×4 cm² and luminescing yellow, the printing ink used including a mixture of the red and of the green luminescent pigment of the counterexample 1.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission (ΔD) relative to the initial value after achievement of the blue wool scale rating is represented in the following table.

| Blue wool scale | Tristimulus values emission | ΔD |
|---|---|---|
| Initial value | x = 0.4273; y = 0.5225 | — |
| 1 | x = 0.3719; y = 0.5669 | 0.07099 |
| 2 | x = 0.3589; y = 0.5773 | 0.08764 |
| 3 | x = 0.3544; y = 0.5810 | 0.09347 |

The two luminescent pigments employed in the mixture differ in their light fastnesses, thereby the color impression of the emission significantly changing upon irradiation with light.

A viewer will hence perceive a clear alteration of the color tone of the luminescence from yellow to green, when the value document, e.g., was exposed to solar radiation for a long time.

The proofs are thus not suitable as a visual security feature (varying color impression) and likewise not suitable as a machine-readable security feature (no detectable constant emission spectrum or no constant tristimulus value).

Further such printed value documents are tested for their chemical stability according to test method A30.

| Test substance | Tristimulus values emission | ΔD |
|---|---|---|
| (before treatment) | x = 0.4273; y = 0.5225 | — |
| Ethyl acetate, 30 minutes | x = 0.3406; y = 0.5920 | 0.11111 |
| Toluene, 30 minutes | x = 0.3394; y = 0.5930 | 0.11267 |
| Hydrochloric acid 5%, 30 minutes | x = 0.4061; y = 0.5395 | 0.02717 |
| Sodium hydroxide 2%, 30 minutes | x = 0.4032; y = 0.5418 | 0.03087 |
| Sodium hypochlorite, 5% active chlorine, 30 minutes | x = 0.3817; y = 0.5590 | 0.05840 |

Due to the different chemical stabilities of the luminescent pigments employed in the mixture the proofs show a shift of the color tone of the emission after treatment with certain solvents. Hence, the perceived luminescence color of the proof does significantly change for the eye after the treatment with solvents. The luminescence of the proof shifts from yellow to green.

The proofs are thus not suitable as a visual security feature (varying color impression) and likewise not suitable as a machine-readable security feature (no detectable constant emission spectrum or no constant tristimulus value).

Embodiment Example 2: Pigment System of Red and Green Capsule-Luminescent Pigments with Duromer Core and Condensation-Polymer Shell As a red luminescing pigment a core-shell particle with a polyurea core and a melamine-formaldehyde shell is used, which as dyes distributed or dissolved in the core includes a mixture of the three dyes N-(2-(4-oxo-4H-benzo[d][1,3]oxazine-2-yl)phenyl)naphthalene-2-sulfonamide ($C_{24}H_{16}N_2O_4S$), 2,9-Bis(2,6-diisopropylphenyl)-5,6,12,13-tetraphenoxyanthra[2,1,9-def:6,5,10-d'e'f']diisochinolin-1,3,8,10(2H,9H)-tetraone ($C_{72}H_{58}N_2O_8$), and $Eu(TTA)_3(TPPO)_2$ (TTA=thenoyltrifluoroacetone; TPPO=triphenylphosphine oxide).

It corresponds to a capsule-luminescent pigment according to the preferred variant 2.

The luminescent dye $Eu(TTA)_3(TPPO)_2$ here serves in particular for adapting the light fastness at blue wool scale 1 between the red luminescing and green luminescing capsule-luminescent pigments of this embodiment example.

Manufacturing the Red Luminescent Pigment:

In a Laboratory Kneader the Components 70.5 g of isophorone diisocyanate, 24.2 g benzamide, 15.2 g N-(2-(4-oxo-4H-benzo[d][1,3]oxazine-2-yl)phenyl)naphthalene-2-sulfonamide ($C_{24}H_{16}N_2O_4S$), 0.6 g 2,9-Bis(2,6-diisopropylphenyl)-5,6,12,13-tetraphenoxyanthra[2,1,9 def:6,5,10 d'e'f']diisochinolin-1,3,8,10 (2H,9H)-tetraone ($C_{72}H_{58}N_2O_8$), 6.1 g $Eu(TTA)_3(TPPO)_2$ are kneaded at 140° C. for 30 min. Subsequently, 25.10 g of melamine are added and the mixture is kneaded until solidifying. The obtained powder is ground with an agitator ball mill having zirconium oxide grinding balls of approx. 1 mm to a grain size (d99) of 10 µm. 100 g of this powder are given in 1.3 l of water and dispersed with a homogenizer. To this mixture there are given 900 ml of a 20%-aqueous solution of hexahydroxymethylmelamine and dosed with 8 ml of concentrated acetic acid. The obtained reaction mixture is heated for 2 h at 70° C. The obtained coated pigment is centrifuged and washed with 3 l of water. After a last centrifugation step the pigment is dried at 60° C. in a drying oven.

Approx. 175 g of a pigment fluorescing red upon irradiation with UV light of the wavelength 365 nm are obtained.

As a green luminescing pigment there is used a core-shell particle with a polyurea core and a melamine-formaldehyde shell, which includes N-(2-(4-oxo-4H-benzo[d][1,3] oxazine-2-yl)phenyl)naphthalene-2-sulfonamide ($C_{24}H_{16}N_2O_4S$) as a dye distributed and dissolved in the core.

It corresponds to a capsule-luminescent pigment according to the preferred variant 2.

Manufacturing the Green Luminescent Pigment:
In a Laboratory Kneader the Components
73.2 g of isophorone diisocyanate,
26.1 g benzamide,
15.3 g N-(2-(4-oxo-4H-benzo[d][1,3]oxazine-2-yl)phenyl) naphthalene-2-sulfonamide ($C_{24}H_{16}N_2O_4S$),
are kneaded at 140° C. for 30 min. Subsequently, 25.10 g of melamine are added and the mixture is kneaded until solidifying. The obtained powder is ground with an agitator ball mill having zirconium oxide grinding balls of approx. 1 mm to a grain size (d99) of 10 µm. 100 g of this powder are given in 1.3 l of water and dispersed with a homogenizer. To this mixture there are given 900 ml of a 20%-aqueous solution of hexahydroxymethylmelamine and dosed with 8 ml of concentrated acetic acid. The obtained reaction mixture is heated for 2 h at 70° C. The obtained coated pigment is centrifuged and washed with 3 l of water. After a last centrifugation step the pigment is dried at 60° C. in a drying oven.

Approx. 175 g of a pigment green fluorescing upon irradiation with UV light of the wavelength 365 nm are obtained.

Both pigments luminesce under UV excitation with 365 nm. When in the following one speaks of these pigments or of inks derived therefrom or proofs "luminescing", this means that they luminesce under UV excitation with 365 nm.

2a) Powder Mixture of Different Luminescent Pigments 50 g of the red luminescing pigment and 50 g of the green luminescing pigment are mixed with each other. The mixture luminesces yellow.

2b) Printing Ink of a Powder Mixture with Different Luminescent Pigments

The powder mixture of embodiment example 2a is worked into offset printing lacquer (Sicpa Holding SA) with the help of a three roll mill. The pigmentation degree of the ink here is 15 weight percent. The obtained offset printing ink luminesces yellow.

On account of the similarity of the pigments included in the mixture there is no fractionation of the pigments during or after the ink manufacturing process.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

2c) Printing Ink of Different Printing Inks

A first printing ink is created with the red luminescing pigment, by this being worked into offset printing lacquer (Sicpa holding SA) with the help of a three roll mill. The pigmentation degree of the printing ink is 15 weight percent. The ink luminesces red.

A second printing ink is created with the green luminescing pigment, by this being worked into offset printing lacquer (Sicpa holding SA) with the help of a three roll mill. The pigmentation degree of the printing ink is 15 weight percent. The ink luminesces green.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

By mixing same portions of the first and the second printing ink there is created a third printing ink. This luminesces yellow. It does not differ in terms of content from the printing ink in embodiment example 2b. On account of the similarity of the pigments used in the first and second color these behave identically in the printing ink and can be mixed without incompatibilities.

Therefore it is possible to create mixed inks either from powder mixtures (2b) or from the primary colors of the pure pigments (2c).

2d) Value Document with Separate Imprint of Two Different Luminescent Pigments

The red luminescing ink and the green luminescing ink of embodiment example 2c are respectively printed onto different places of the same value document. The proof thickness here is 2 g/m². The proofs of the two inks here form two strips printed side by side on the value document, with the respective size of 2×4 cm², which luminesce red and green, respectively.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after achievement of the blue wool scale rating is represented in the following table.

| Blue wool scale | Residual intensity red [%] | Residual intensity green [%] | Difference [percentage points] |
|---|---|---|---|
| Initial value | 100 | 100 | 0 |
| 1 | 87 | 88 | 1 |
| 2 | 84 | 78 | 6 |
| 3 | 74 | 65 | 9 |

After the same action of light the printed inks lose approximately the same amount of luminescence intensity. Hence, the relative ratio of the emission intensity of the two colors does not change for the eye. The entire security feature can be uniformly recognized and a machine evaluation of the constant intensity ratio of the different emissions is possible.

Further such printed value documents are tested for their chemical stability according to test method A30 or A5.

| Test substance | Residual intensity red [%] | Residual intensity green [%] | Difference [percentage points] |
|---|---|---|---|
| Ethyl acetate, 30 minutes | 99 | 98 | 1 |
| Toluene, 30 minutes | 99 | 97 | 2 |
| Hydrochloric acid 5%, 30 minutes | 97 | 99 | 2 |
| Sodium hydroxide 2%, 30 minutes | 98 | 99 | 1 |

-continued

| Test substance | Residual intensity red [%] | Residual intensity green [%] | Difference [percentage points] |
|---|---|---|---|
| Sodium hypochlorite, 5% active chlorine, 30 minutes | 99 | 97 | 2 |
| Acetone, 5 minutes | 99 | 98 | 1 |

The proofs show on account of the similar chemical stability of the luminescent pigments no great relative differences in the remaining luminescence intensity. Hence, the relative ratio of the emission intensity of the two colors does not change for the eye.

The entire security feature can be uniformly recognized and a machine evaluation of the constant intensity ratio of the different emissions is possible.

2e) Value Document with Imprint of a Mixture of Two Different Luminescent Pigments The yellow luminescing mixed ink of embodiment example 2c is printed onto a value document. The proof thickness here is 2 g/m². The proof here forms a square printed on the value document and has the size 4×4 cm², which luminesces yellow.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission (ΔD) relative to the initial value after achievement of the blue wool scale rating is represented in the following table.

| Blue wool scale | Tristimulus values emission | ΔD |
|---|---|---|
| Initial value | x = 0.4313; y = 0.4681 | — |
| 1 | x = 0.4308; y = 0.4688 | 0.00086 |
| 2 | x = 0.4345; y = 0.4637 | 0.00544 |
| 3 | x = 0.4370; y = 0.4603 | 0.00966 |

On account of the similar light fastness of the two employed pigments the color impression of the emission of the mixed ink hardly alters. A viewer will hence perceive no alteration of the color tone of the luminescence, even when the value document was exposed, e.g. to solar radiation for a long time.

The security feature can thus be clearly recognized by a viewer and a machine evaluation of the spectrum or of the tristimulus value is possible.

Further such printed value documents are tested for their chemical stability according to test method A30. The change of the color impression of the emission (ΔD) relative to the value before the chemical treatment of the proof is represented in the following table.

| Test substance | Tristimulus values emission | ΔD |
|---|---|---|
| (before treatment) | x = 0.4313; y = 0.4681 | — |
| Ethyl acetate, 30 minutes | x = 0.4312; y = 0.4680 | 0.00014 |
| Toluene, 30 minutes | x = 0.4314; y = 0.4681 | 0.00010 |
| Hydrochloric acid 5%, 30 minutes | x = 0.4313; y = 0.4680 | 0.00010 |
| Sodium hydroxide 2%, 30 minutes | x = 0.4310; y = 0.4680 | 0.00031 |
| Sodium hypochlorite, 5% active chlorine, 30 minutes | x = 0.4314; y = 0.4681 | 0.00010 |

The proofs show, on account of the similar chemical stability of the luminescent pigments which were employed in the mixture, no shift of the color tone of the emission. Hence, the perceived color tone of the luminescence of the proof does not change for the eye even after the treatment with solvents.

The security feature can thus be clearly recognized by a viewer and a machine evaluation of the spectrum or of the tristimulus value is possible.

2f) Imprint with True-Color Fluorescence

In addition to the red and green ink of embodiment example 2c, a third, blue luminescing printing ink is manufactured. This is a pigment analogously structured, which includes, relative to the core mass, 5 weight percent of the dye 4,4'-Bis(benzoxazole-2-yl)stilbene($C_{28}H_{18}N_2O_2$) and was analogously worked into an offset printing ink.

All three inks luminesce upon UV irradiation with 365 nm.

With the three inks a true-color image is printed onto a value document, e.g. an RGB color circle with a white dot in the center. By combining the three primary colors red, green and blue arbitrary mixed colors or color gradations can be generated here by superimposition of the printing inks. Due to the similar light fastness and chemical stability of the individual primary colors the color tones of the mixed inks and the color gradations remain unchanged in their color tone also with solar irradiation or treatment with solvents.

Counterexample 2: Luminescence System of Red and Green Pigments without Adjusted Stabilities As a red luminescing pigment there is used the polyurea pigment which is described in example 4 of the patent application U.S. Pat. No. 5,795,379 A. It is structured similarly to the red luminescing pigment of the embodiment example 2, but possesses no additional protecting shell (and hence no adjusted chemical stability) and no adjusted dye composition (and hence no adjusted light fastness).

As a green luminescing pigment there is used the same capsule pigment as in the embodiment example 2.

Both pigments luminesce under UV excitation with 365 nm. When in the following one speaks of these pigments or of inks derived therefrom or proofs "luminescing", this means that they luminesce under UV excitation with 365 nm.

The two pigments are incorporated into printing inks and printed onto value documents, analogously to the steps in embodiment example 2.

Counterexample for "Value Document with Separate Imprint of Two Different Luminescent Pigments"

Analogously to the embodiment example 2d, onto a value document there are printed two strips lying side by side having the respective size of 2×4 cm² and respectively luminescing red and green.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after the achievement of the blue wool scale rating is represented in the following table.

| Blue wool scale | Residual intensity red [%] | Residual intensity green [%] | Difference [percentage points] |
| --- | --- | --- | --- |
| Initial value | 100 | 100 | 0 |
| 1 | 33 | 89 | 56 |
| 2 | 21 | 78 | 57 |
| 3 | 15 | 68 | 53 |

The proofs of the two colors significantly differ in their light fastness and lose differently sized portions of their luminescence intensity upon irradiation with light. Hence, the relative ratio of the emission intensity of the two inks significantly changes for a viewer. The red luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Further such printed value documents are tested for their chemical stability according to test method A30 or A5.

| Test substance | Residual intensity red [%] | Residual intensity green [%] | Difference [percentage points] |
| --- | --- | --- | --- |
| Ethyl acetate, 30 minutes | 43 | 99 | 56 |
| Toluene, 30 minutes | 95 | 98 | 3 |
| Hydrochloric acid 5%, 30 minutes | 78 | 99 | 21 |
| Sodium hydroxide 2%, 30 minutes | 79 | 98 | 19 |
| Sodium hypochlorite, 5% active chlorine, 30 minutes | 72 | 97 | 25 |
| Acetone, 5 minutes | 40 | 99 | 59 |

The proofs of the two inks show significantly different chemical stabilities. Hence, the relative ratio of the emission intensity of the two colors does significantly change for the eye. The red luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Counterexample for "Value Document with Imprint of a Mixture of Two Different Luminescent Pigments"

Onto a value document there is printed, analogously to the embodiment example 2e, a square of the size 4×4 cm$^2$ and luminescing yellow, the printing ink used including a mixture of the red and of the green luminescent pigment of the counterexample 2.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission ($\Delta D$) relative to the initial value after achievement of the blue wool scale rating is represented in the following table.

| Blue wool scale | Tristimulus values emission | $\Delta D$ |
| --- | --- | --- |
| Initial value | x = 0.4035; y = 0.5416 | — |
| 1 | x = 0.3663; y = 0.5714 | 0.04766 |
| 2 | x = 0.3594; y = 0.5769 | 0.05648 |
| 3 | x = 0.3559; y = 0.5797 | 0.06097 |

The two luminescent pigments employed in the mixture differ in their light fastnesses, thereby the color impression of the emission significantly changing upon irradiation with light.

A viewer will hence perceive a clear alteration of the color tone of the luminescence from yellow to green, when the value document, e.g., was exposed to solar radiation for a long time.

The proofs are thus not suitable as a visual security feature (varying color impression) and likewise not suitable as a machine-readable security feature (no detectable constant emission spectrum or no constant tristimulus value).

Further such printed value documents are tested for their chemical stability according to test method A30.

| Test substance | Tristimulus values emission | $\Delta D$ |
| --- | --- | --- |
| (before treatment) | x = 0.4035; y = 0.5416 | — |
| Ethyl acetate, 30 minutes | x = 0.3705; y = 0.5680 | 0.04226 |
| Toluene, 30 minutes | x = 0.4014; y = 0.5433 | 0.00270 |
| Hydrochloric acid 5%, 30 minutes | x = 0.3920; y = 0.5508 | 0.01472 |
| Sodium hydroxide 2%, 30 minutes | x = 0.3930; y = 0.5500 | 0.01344 |
| Sodium hypochlorite, 5% active chlorine, 30 minutes | x = 0.3894; y = 0.5529 | 0.01806 |

Due to the different chemical stabilities of the luminescent pigments employed in the mixture the proofs show a shift of the color tone of the emission after treatment with certain solvents. Hence, the perceived luminescence color of the proof does significantly change for the eye after the treatment with solvents. The luminescence of the proof shifts from yellow to green.

The proofs are thus not suitable as a visual security feature (varying color impression) and likewise not suitable as a machine-readable security feature (no detectable constant emission spectrum or no constant tristimulus value).

Embodiment Example 3: Pigment System of Blue and Green Capsule-Luminescent Pigments with Several Thermoplastic Cores and Addition-Polymer Shell As a blue luminescing pigment there is used a core-shell particle with several polymethyl-methacrylate cores and a polyurea shell, which includes 2.5-thiophendiylbis(5-tert-butyl-1,3-benzoxazole) as a dye dissolved in the cores.

It corresponds to a capsule-luminescent pigment according to the preferred variant 3.

Manufacturing the Blue Luminescent Pigment:

50 g of PMMA with an average mol weight of 100000 g/mol are dissolved with 5 g of 2,5-thiophendiylbis(5-tert-butyl-1,3-benzoxazole) ($C_{26}H_{26}N_2O_2S$) in 1 liter chloroform. The mixture is given into a reactor with 5 liters of an aqueous solution of 1% sodium dodecyl sulfate and dispersed with a homogenizer for 5 min. Subsequently, the chloroform is evaporated under stirring at 500 mbar. The remaining aqueous phase includes, after removal of the chloroform, approx. 55 g spheres of PMMA having an average particle size of approx. 2 μm, which include the dissolved dye (in the following referred to as "PMMA B"). With an ultracentrifuge the particles are washed three times with respectively 1 liter water and subsequently dried at 60° C.

In a Laboratory Kneader the Components
79.63 g of the isocyanurate trimer of isophorone diisocyanate
22.46 g benzamide
2.00 g urea
14.12 g melamine
10 g PMMA B
are kneaded at 180° C. until solidifying. The obtained pellets are ground to a grain size (d99) of 11 μm.

Approx. 50 g of a pigment fluorescing blue upon irradiation with UV light of the wavelength 365 nm are obtained.

As a green luminescing pigment there is used a core-shell particle with several polymethyl-methacrylate cores and a polyurea shell, which includes N-(2-(4-oxo-4H-benzo[d][1,3]oxazine-2-yl)phenyl)naphthalene-2-sulfonamide ($C_{24}H_{16}N_2O_4S$) as a dye dissolved in the cores.

It corresponds to a capsule-luminescent pigment according to the preferred variant 3.

Manufacturing the Green Luminescent Pigment:

50 g of PMMA with an average mol weight of 100000 g/mol are dissolved with 5 g N-(2-(4-oxo-4H-benzo[d][1,3]oxazine-2-yl)phenyl)naphthalene-2-sulfonamide ($C_{24}H_{16}N_2O_4S$) in 1 liter of dichloromethane. The mixture is given into a reactor with 5 liters of an aqueous solution of 1% sodium dodecyl sulfate and dispersed with a homogenizer for 5 min. Subsequently, the dichloromethane is evaporated under stirring at 500 mbar. The remaining aqueous phase includes, after removal of the dichloromethane, approx. 55 g spheres of PMMA having an average particle size of approx. 2 μm, which include the dissolved dye (in the following referred to as "PMMA G"). With an ultracentrifuge the particles are washed three times with respectively 1 liter water and subsequently dried at 60° C.

In a Laboratory Kneader the Components
79.63 g of the isocyanurate trimer of isophorone diisocyanate
22.46 g benzamide
2.00 g urea
14.12 g melamine
10 g PMMA G
are kneaded at 180° C. until solidifying. The obtained pellets are ground to a grain size (d99) of 11 μm.

Approx. 50 g of a pigment green fluorescing upon irradiation with UV light of the wavelength 365 nm are obtained.

Both pigments luminesce under UV excitation with 365 nm. When in the following one speaks of these pigments or of inks derived therefrom or proofs "luminescing", this means that they luminesce under UV excitation with 365 nm.

3a) Powder Mixture of Different Luminescent Pigments 50 g of the blue luminescing pigment and 50 g of the green luminescing pigment are mixed with each other. The mixture luminesces cyan (blue-green).

3b) Printing Ink of a Powder Mixture with Different Luminescent Pigments

The powder mixture of embodiment example 3a is worked into offset printing lacquer (hubergroup Deutschland GmbH) with the help of a three roll mill. The pigmentation degree of the ink here is 15 weight percent. The obtained offset printing ink luminesces cyan.

On account of the similarity of the pigments included in the mixture there is no fractionation of the pigments during or after the ink manufacturing process.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

3c) Printing Ink of Different Printing Inks

A first printing ink is created with the blue luminescing pigment, by this being worked into offset printing lacquer (hubergroup Deutschland GmbH) with the help of a three roll mill. The pigmentation degree of the printing ink is 15 weight percent. The ink luminesces blue.

A second printing ink is created with the green luminescing pigment, by this being worked into offset printing lacquer (hubergroup Deutschland GmbH) with the help of a three roll mill. The pigmentation degree of the printing ink is 15 weight percent. The ink luminesces green.

Instead of working the pigments directly into the printing lacquer, first there can also be manufactured an ink concentrate from the pigments (e.g. with a pigment portion of 50%) and then the ink concentrate can be worked into the printing lacquer. This has, among others, application-technical advantages (quicker working in, no dust when working in, . . . )

By mixing same portions of the first and the second printing ink there is created a third printing ink. This luminesces cyan. It does not differ in terms of content from the printing ink in embodiment example 3b. On account of the similarity of the pigments used in the first and second color these behave identically in the printing ink and can be mixed without incompatibilities.

Therefore it is possible to create mixed inks either from powder mixtures (3b) or from the primary colors of the pure pigments (3c).

3d) Value Document with Separate Imprint of Two Different Luminescent Pigments

The blue luminescing ink and the green luminescing ink of embodiment example 3c are respectively printed onto different places of the same value document. The proof thickness here is 2 g/m$^2$. The proofs of the two inks here form two strips printed side by side on the value document, with the respective size of 2×4 cm$^2$, which luminesce blue and green, respectively.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after achievement of the blue wool scale rating is represented in the following table.

| Blue wool scale | Residual intensity blue [%] | Residual intensity green [%] | Difference [percentage points] |
| --- | --- | --- | --- |
| Initial value | 100 | 100 | 0 |
| 1 | 82 | 87 | 5 |
| 2 | 76 | 79 | 3 |
| 3 | 65 | 66 | 1 |

After the same action of light the printed inks lose approximately the same amount of luminescence intensity. Hence, the relative ratio of the emission intensity of the two colors does not change for the eye. The entire security feature can be uniformly recognized and a machine evaluation of the constant intensity ratio of the different emissions is possible.

Further such printed value documents are tested for their chemical stability according to test method A30 or A5.

| Test substance | Residual intensity blue [%] | Residual intensity green [%] | Difference [percentage points] |
| --- | --- | --- | --- |
| Ethyl acetate, 30 minutes | 85 | 83 | 2 |
| Toluene, 30 minutes | 95 | 94 | 1 |
| Hydrochloric acid 5%, 30 minutes | 94 | 95 | 1 |
| Sodium hydroxide 2%, 30 minutes | 86 | 84 | 2 |
| Sodium hypochlorite, 5% active chlorine, 30 minutes | 91 | 92 | 1 |
| Acetone, 5 minutes | 82 | 83 | 1 |

The proofs show on account of the similar chemical stability of the luminescent pigments no great relative differences in the remaining luminescence intensity. Hence, the relative ratio of the emission intensity of the two colors does not change for the eye.

The entire security feature can be uniformly recognized and a machine evaluation of the constant intensity ratio of the different emissions is possible.

3e) Value Document with Imprint of a Mixture of Two Different Luminescent Pigments The cyan luminescing mixed ink of embodiment example 3c is printed onto a value document. The proof thickness here is 2 g/m². The proof here forms a square printed on the value document and has the size 4×4 cm², which luminesces cyan.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission (ΔD) relative to the initial value after achievement of the blue wool scale rating is represented in the following table.

| Blue wool scale | Tristimulus values emission | ΔD |
| --- | --- | --- |
| Initial value | x = 0.2151; y = 0.2968 | — |
| 1 | x = 0.2181; y = 0.3038 | 0.00761 |
| 2 | x = 0.2171; y = 0.3014 | 0.00501 |
| 3 | x = 0.2159; y = 0.2986 | 0.00196 |

On account of the similar light fastness of the two employed pigments the color impression of the emission of the mixed ink hardly alters. A viewer will hence perceive no alteration of the color tone of the luminescence, even when the value document was exposed, e.g. to solar radiation for a long time.

The security feature can thus be clearly recognized by a viewer and a machine evaluation of the spectrum or of the tristimulus value is possible.

Further such printed value documents are tested for their chemical stability. The change of the color impression of the emission (ΔD) relative to the value before the chemical treatment of the proof is represented in the following table.

| Test substance | Tristimulus values emission | ΔD |
| --- | --- | --- |
| (before treatment) | x = 0.2151; y = 0.2968 | — |
| Ethyl acetate, 30 minutes | x = 0.2140; y = 0.2940 | 0.00300 |
| Toluene, 30 minutes | x = 0.2146; y = 0.2955 | 0.00170 |
| Hydrochloric acid 5%, 30 minutes | x = 0.2145; y = 0.2955 | 0.00139 |
| Sodium hydroxide 2%, 30 minutes | x = 0.2140; y = 0.2940 | 0.00030 |
| Sodium hypochlorite, 5% active chlorine, 30 minutes | x = 0.2157; y = 0.2981 | 0.00143 |

The proofs show, on account of the similar chemical stability of the luminescent pigments which were employed in the mixture, no shift of the color tone of the emission. Hence, the perceived color tone of the luminescence of the proof does not change for the eye even after the treatment with solvents.

The security feature can thus be clearly recognized by a viewer and a machine evaluation of the spectrum or of the tristimulus value is possible.

3f) Imprint with True-Color Fluorescence

In addition to the blue and green ink of embodiment example 3c, a third, red luminescing printing ink is manufactured. This is an analogously structured pigment which includes, relative to the core mass, at the same time 5.5 weight percent of the dye N-(2-(4-oxo-4H-benzo[d][1,3]oxazine-2-yl)phenyl)naphthalene-2-sulfonamide ($C_{24}H_{16}N_2O_4S$), 0.35 weight percent of the dye $Eu(TTA)_3(TPPO)_2$ and 0.35 weight percent of the dye 2,9-Bis(2,6-diisopropylphenyl)-5,6,12,13-tetraphenoxyanthra[2,1,9-def:6,5,10-d'e'f']diisochinolin-1,3,8,10(2H,9H)-tetraone ($C_{72}H_{58}N_2O_8$) and was analogously worked into an offset printing ink.

All three inks luminesce upon UV irradiation with 365 nm.

With the three inks a true-color image is printed onto a value document, e.g. an RGB color circle with a white dot in the center. By combining the three primary colors red, green and blue arbitrary mixed colors or color gradations can be generated here by superimposition of the printing inks. Due to the similar light fastness and chemical stability of the individual primary colors the color tones of the mixed inks and the color gradations remain unchanged in their color tone also with solar irradiation or treatment with solvents.

Counterexample 3: Luminescence System of Blue and Green Pigments without Adjusted Stabilities As a blue luminescing pigment there is used a PMMA particle loaded with 4,4'-Bis(2-methoxystyryl)-1,1'-biphenyl ($C_{30}H_{26}O_2$) without additional addition-polymer shell. It is structured similarly to the blue luminescing pigment of the embodiment example 3, but possesses no additional protecting shell (and hence no adjusted chemical stability) and no adjusted dye composition (and hence no adjusted light fastness).

As a green luminescing pigment there is used the same capsule pigment as in the embodiment example 3.

Both pigments luminesce under UV excitation with 365 nm. When in the following one speaks of these pigments or of inks derived therefrom or proofs "luminescing", this means that they luminesce under UV excitation with 365 nm.

The two pigments are incorporated into printing inks and printed onto value documents, analogously to the steps in embodiment example 3.

Counterexample for "Value Document with Separate Imprint of Two Different Luminescent Pigments"

Analogously to the embodiment example 3d, onto a value document there are printed two strips lying side by side having the respective size of 2×4 cm² and respectively luminescing blue and green.

The respective fluorescence intensity of the two proofs is measured quantitatively with the help of a fluorescence spectrometer and is normalized to 100%. Subsequently, the value document is subjected to a blue wool scale test analogous to EN ISO 105-B01:1999 in a Q-Lab Xenon test chamber (Q-SUN Xe-2-H). The remaining residual intensity after the achievement of the blue wool scale rating is represented in the following table.

| Blue wool scale | Residual intensity blue [%] | Residual intensity green [%] | Difference [percentage points] |
| --- | --- | --- | --- |
| Initial value | 100 | 100 | 0 |
| 1 | 66 | 87 | 21 |
| 2 | 42 | 78 | 46 |
| 3 | 19 | 66 | 47 |

The proofs of the two colors significantly differ in their light fastness and lose differently sized portions of their luminescence intensity upon irradiation with light. Hence, the relative ratio of the emission intensity of the two inks significantly changes for a viewer. The blue luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Further such printed value documents are tested for their chemical stability according to test method A30 or A5.

| Test substance | Residual intensity blue [%] | Residual intensity green [%] | Difference [percentage points] |
| --- | --- | --- | --- |
| Ethyl acetate, 30 minutes | 3 | 82 | 79 |
| Toluene, 30 minutes | 1 | 94 | 93 |
| Hydrochloric acid 5%, 30 minutes | 71 | 95 | 24 |
| Sodium hydroxide 2%, 30 minutes | 67 | 83 | 16 |
| Sodium hypochlorite, 5% active chlorine, 30 minutes | 51 | 91 | 40 |
| Acetone, 5 minutes | 2 | 83 | 81 |

The proofs of the two inks show significantly different chemical stabilities. Hence, the relative ratio of the emission intensity of the two colors does significantly change for the eye. The blue luminescing part of the proof becomes significantly weaker or disappears, while the green luminescing part of the proof still strongly luminesces.

The proofs are thus not suitable as a visual security feature (no unambiguous and uniform recognition of the security feature by the viewer) and likewise are not suitable as a machine-readable security feature (no detectable constant intensity ratio between the respective intensities).

Counterexample for "Value Document with Imprint of a Mixture of Two Different Luminescent Pigments"

Analogously to the embodiment example 3e, onto a value document there is printed a square of the size 4×4 cm² which luminesces cyan, wherein the printing ink used includes a mixture of the blue and the green luminescent pigment of the counterexample 3.

The fluorescence intensity of the proof is measured quantitatively with the help of a fluorescence spectrometer and the tristimulus value of the measured luminescence emission is calculated. Subsequently, the value document is subjected to a blue wool scale test analogous to EN ISO 105-B01:1999 in a Q-Lab Xenon test chamber (Q-SUN Xe-2-H). The change of the color impression of the emission (ΔD) relative to the initial value after achievement of the blue wool scale rating is represented in the following table.

| Blue wool scale | Tristimulus values emission | ΔD |
| --- | --- | --- |
| Initial value | x = 0.2151; y = 0.2968 | — |
| 1 | x = 0.2292; y = 0.3302 | 0.03625 |
| 2 | x = 0.2468; y = 0.3723 | 0.08188 |
| 3 | x = 0.2769; y = 0.4440 | 0.15964 |

The two luminescent pigments employed in the mixture differ in their light fastnesses, thereby the color impression of the emission significantly changing upon irradiation with light.

A viewer will hence perceive a clear alteration of the color tone of the luminescence from cyan to green, when the value document, e.g., was exposed to solar radiation for a long time.

The proofs are thus not suitable as a visual security feature (varying color impression) and likewise not suitable as a machine-readable security feature (no detectable constant emission spectrum or no constant tristimulus value).

Further such printed value documents are tested for their chemical stability according to test method A30.

| Test substance | Tristimulus values emission | ΔD |
| --- | --- | --- |
| (before treatment) | x = 0.2151; y = 0.2968 | — |
| Ethyl acetate, 30 minutes | x = 0.3286; y = 0.5673 | 0.29334 |
| Toluene, 30 minutes | x = 0.3361; y = 0.5852 | 0.31275 |
| Hydrochloric acid 5%, 30 minutes | x = 0.2299; y = 0.3320 | 0.03818 |
| Sodium hydroxide 2%, 30 minutes | x = 0.2260; y = 0.3226 | 0.02800 |
| Sodium hypochlorite, 5% active chlorine, 30 minutes | x = 0.2448; y = 0.3674 | 0.07659 |

Due to the different chemical stabilities of the luminescent pigments employed in the mixture the proofs show a shift of the color tone of the emission after treatment with certain solvents. Hence, the perceived luminescence color of the proof does significantly change for the eye after the treatment with solvents. The luminescence of the proof shifts from cyan to green.

The proofs are thus not suitable as a visual security feature (varying color impression) and likewise not suitable as a machine-readable security feature (no detectable constant emission spectrum or no constant tristimulus value).

The invention claimed is:

1. A pigment system with at least two kinds of capsule-luminescent pigments which have different emission spectra of the luminescence emission and which respectively have at least one core with a luminescent substance and a shell encapsulating the at least one core;
   wherein the luminescent substances respectively are organic or metalorganic luminescent substances;
   wherein the material of the shell is chosen from aminoplasts, phenoplasts, melamine formaldehyde resins (MF), melamine phenol formaldehyde resins (MPF), phenol formaldehyde resins (PF), urea formaldehyde resins (UF), melamine guanidine formaldehyde resins or phenol resorcin formaldehyde resins; and
   wherein for each of the at least two kinds of capsule-luminescent pigments the material of the at least one core, the material of the shell, and the thickness of the shell are mutually coordinated such that the at least two kinds of capsule-luminescent pigments have a substantially same chemical stability.

2. A pigment system made of at least two kinds of capsule-luminescent pigments with different emission spectra, wherein a material of a shell of the capsule-luminescent pigments is respectively chosen from a condensation polymer in order to impart substantially same chemical stabilities to the capsule-luminescent pigments;
   wherein luminescent substances of the at least two kinds of capsule luminescent pigments comprise organic or metalorganic luminescent substances; and
      wherein the material of the shell is chosen from aminoplasts, phenoplasts, melamine formaldehyde resins (MF), melamine phenol formaldehyde resins (MPF), phenol formaldehyde resins (PF), urea formaldehyde resins (UF), melamine guanidine formaldehyde resins or phenol resorcin formaldehyde resins; or
      wherein the capsule-luminescent pigments comprise a duromer matrix, and embedded therein a plurality of core particles of a thermoplastic polymer.

3. The pigment system according to claim 1, wherein the at least two kinds of capsule-luminescent pigments have the same shell material.

4. The pigment system according to claim 1, wherein the at least two kinds of capsule-luminescent pigments have a substantially same chemical stability against organic solvents, aqueous acids, aqueous bases and aqueous redox-active solutions.

5. The pigment system according to claim 1, wherein the at least two kinds of capsule-luminescent pigments have a substantially same chemical stability upon an exposure to toluene, ethyl acetate, hydrochloric acid (5%), sodium hydroxide solution (2%) and sodium hypochlorite solution (5% active chlorine) for 5 minutes, wherein the luminescence intensity remaining after the test is higher than 80% of the initial intensity.

6. The pigment system according to claim 1, wherein the at least two kinds of capsule-luminescent pigments have different color impressions of the luminescence emission.

7. The pigment system according to claim 1, wherein at least one kind of capsule-luminescent pigment is excitable with UVA radiation.

8. The pigment system according to claim 1, wherein at least one kind of capsule-luminescent pigment is excitable with UVC radiation.

9. The pigment system according to claim 1 wherein in at least one kind of capsule-luminescent pigment there are present two different luminescent substances in finely distributed or dissolved form, which form an energy transfer system in which the first luminescent substance after excitation transfers its excitation energy partially or completely to the second luminescent substance.

10. The pigment system according to claim 1, wherein the different kinds of capsule-luminescent pigments have substantially the same chemical stability against acetone according to the test method A5, wherein the luminescence intensity remaining after the test is higher than 80% of the initial intensity.

11. The pigment system according to claim 1, wherein the different kinds of capsule-luminescent pigments have substantially the same light fastness, differing by less than 30 percentage points according to test method B and achieving at least blue wool scale 3.

12. The pigment system according to claim 1, wherein the color impression of the luminescence emission of the arbitrary mixtures of the capsule-luminescent pigments shifts by less than ΔD<0.03 at blue wool scale 1 after UV irradiation according to test method B.

13. The pigment system according to claim 1, wherein at least one kind of capsule-luminescent pigment comprises a mixture of luminescent substances, each of the different luminescent substances of the mixture having different light fastnesses.

14. The pigment system according to claim 11, comprising a mixture of two kinds of capsule-luminescent pigments with substantially same color impression, but different light fastnesses, said mixture configured to have substantially the same light fastness in sum as a third capsule-luminescent pigment with different color impression of the luminescence emission.

15. The pigment system according to claim 1, which comprises at least 3 kinds of capsule-luminescent pigments with different color impression, wherein the respective color impressions of the luminescence emission are red, green and blue.

16. A set of ink concentrate with at least two ink concentrates comprising a pigment system according to claim 1, wherein the kinds of capsule-luminescent pigments are respectively present in the ink concentrates with a capsule-luminescent pigment portion of >40%.

17. A set of printing inks with at least two printing inks comprising a pigment system according to claim 1, wherein the kinds of capsule-luminescent pigments are respectively present in the printing inks with a capsule-luminescent pigment portion of 1-40%.

18. A printing ink comprising a pigment mixture of the pigment system according to claim 1.

19. A masterbatch, value document substrate, security foil, mottling fiber or security thread comprising a polymer composition, the polymer composition comprising a pigment system according to claim 1.

20. A value document, mottling fiber, security thread or security foil comprising a pigment system according to claim 1.

21. The value document, mottling fiber, security thread or security foil according to claim 20, wherein the different kinds of capsule-luminescent pigments are printed either together in a mixed ink at one place or respectively separate at different places.

22. The value document or security foil according to claim 20, wherein the different kinds of capsule-luminescent pigments form a luminescent true-color picture.

23. A pigment system with at least two kinds of capsule-luminescent pigments which have different emission spectra of the luminescence emission and which respectively have at least one core with a luminescent substance and a shell encapsulating the at least one core;
- wherein the luminescent substances respectively are organic or metalorganic luminescent substances;
- wherein the capsule-luminescent pigments comprise a duromer matrix, and embedded therein a plurality of core particles of a thermoplastic polymer; and
- wherein for each of the at least two kinds of capsule-luminescent pigments the material of the at least one core, the material of the shell, and the thickness of the shell are mutually coordinated such that the at least two kinds of capsule-luminescent pigments have a substantially same chemical stability.

\* \* \* \* \*